(12) United States Patent
Benisty et al.

(10) Patent No.: US 10,896,139 B2
(45) Date of Patent: Jan. 19, 2021

(54) METHODS AND APPARATUS FOR HOST REGISTER ACCESS FOR DATA STORAGE CONTROLLERS FOR ONGOING STANDARDS COMPLIANCE

(71) Applicant: Western Digital Technologies, Inc., San Jose, CA (US)

(72) Inventors: Shay Benisty, Beer Sheva (IL); Elkana Richter, Tene (IL); Alexey Martynenko, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 166 days.

(21) Appl. No.: 16/100,148

(22) Filed: Aug. 9, 2018

(65) Prior Publication Data
US 2019/0286581 A1 Sep. 19, 2019

Related U.S. Application Data

(60) Provisional application No. 62/683,491, filed on Jun. 11, 2018, provisional application No. 62/643,660, filed on Mar. 15, 2018.

(51) Int. Cl.
*G06F 13/16* (2006.01)
*G06F 13/364* (2006.01)
(Continued)

(52) U.S. Cl.
CPC ........ *G06F 13/1605* (2013.01); *G06F 12/063* (2013.01); *G06F 12/14* (2013.01); *G06F 13/364* (2013.01); *G06F 2212/206* (2013.01)

(58) Field of Classification Search
CPC .... G06F 12/0246; G06F 12/063; G06F 12/14; G06F 13/1605; G06F 13/364; G06F 2212/206
See application file for complete search history.

(56) References Cited

U.S. PATENT DOCUMENTS 8,832,499 B2 * 9/2014 Saghi .................... G06F 9/4411
714/30

OTHER PUBLICATIONS

NVM Express; "Non-Volatile Memory Express" Revision 1.3a, dated Oct. 24, 2017; 287 pages.

* cited by examiner

*Primary Examiner* — Idriss N Alrobaye
*Assistant Examiner* — Richard B Franklin
(74) *Attorney, Agent, or Firm* — Loza & Loza, LLP; Gabriel Fitch

(57) ABSTRACT

The present disclosure describes technologies and techniques for use by a data storage controller (such as a non-volatile memory (NVM) controller) to emulate hardware registers in software and/or firmware. In illustrative examples, an arbiter of the NVM controller arbitrates inbound register accesses from a host. Regular register accesses from the host are directed by the arbiter along a regular hardware read path within the NVM controller to physical memory registers. Other transactions (e.g. writes to, or reads from, an undefined or reserved address space) are instead directed by the arbiter to the processor of the NVM controller for handling by software running on the processor (and/or by firmware). In this manner, new hardware registers added to an NVM standard may be implemented by software and/or firmware rather than hardware. Hence, the NVM controller may comply with new standard requirements without changing the hardware. NVMe examples are provided.

25 Claims, 16 Drawing Sheets

(51) Int. Cl.
*G06F 12/14* (2006.01)
*G06F 12/06* (2006.01)

| Start | End | Symbol | Description |
|---|---|---|---|
| 00h | 07h | CAP | Controller Capabilities |
| 08h | 0Bh | VS | Version |
| 0Ch | 0Fh | INTMS | Interrupt Mask Set |
| 10h | 13h | INTMC | Interrupt Mask Clear |
| 14h | 17h | CC | Controller Configuration |
| 18h | 1Bh | Reserved | Reserved |
| 1Ch | 1Fh | CSTS | Controller Status |
| 20h | 23h | NSSR | NVM Subsystem Reset (Optional) |
| 24h | 27h | AQA | Admin Queue Attributes |
| 28h | 2Fh | ASQ | Admin Submission Queue Base Address |
| 30h | 37h | ACQ | Admin Completion Queue Base Address |
| 38h | 3Bh | CMBLOC | Controller Memory Buffer Location (Optional) |
| 3Ch | 3Fh | CMBSZ | Controller Memory Buffer Size (Optional) |
| 40h | 43h | BPINFO | Boot Partition Information (Optional) |
| 43h | 47h | BPRSEL | Boot Partition Read Select (Optional) |
| 48h | 4Fh | BPMBL | Boot Partition Memory Buffer Location (Optional) |

FIG. 6

METHODS AND APPARATUS FOR HOST REGISTER ACCESS FOR DATA STORAGE CONTROLLERS FOR ONGOING STANDARDS COMPLIANCE

CLAIM OF PRIORITY UNDER 35 U.S.C. § 119

The present Application for Patent claims priority to U.S. Provisional Application No. 62/643,660 entitled "METHODS AND APPARATUS FOR HOST REGISTER ACCESS FOR DATA STORAGE CONTROLLERS FOR ONGOING STANDARDS COMPLIANCE" filed Mar. 15, 2018, and to U.S. Provisional Application No. 62/683,491, also entitled "METHODS AND APPARATUS FOR HOST REGISTER ACCESS FOR DATA STORAGE CONTROLLERS FOR ONGOING STANDARDS COMPLIANCE," filed Jun. 11, 2018, both of which are fully incorporated by reference herein.

FIELD

The subject matter described herein relates to data storage devices and controllers. More particularly, the subject matter relates, in some examples, controlling access by a host to registers within a data storage controller of a non-volatile memory express (NVMe) system.

INTRODUCTION

Solid state devices (SSDs) that incorporate non-volatile memories (NVMs), such as flash NAND memories, are rapidly replacing or supplementing conventional rotating hard disk drives for mass storage in many consumer electronics and computers. In NAND-based products, a host device such as a videocamera or other portable electronic device includes an NVM data storage controller for accessing the NAND. Various industry standards have been developed to facilitate the development and standardization of such devices. One such standard is the non-volatile memory express (NVMe) system provided for use with systems that utilize Peripheral Component Interconnect (PCI) Express-based solid state drives. See, for example, the NVM Express standard, Revision 1.3a, Oct. 24, 2017.

Issues may arise in the development and design of NVM data storage controllers if the particular standard changes (as might occur with possible forthcoming revisions to the NVMe standard, e.g., a Revision 1.4, a Revision 1.5, etc.) To accommodate changes in an NVM specification, such as changes in the NVMe requirements, any application specific integrated circuits (ASICs) employed by the NVM data storage controller may need to be redesigned. Generally speaking, the ASIC development process may be separated into two aspects: the hardware and the software. The hardware is manufactured and made final, while the software may change over time in order to fit a specific product's requirements, e.g. the requirements of a particular data controller. During the development phase, a product specification is defined. However, over time the requirements may change. Often, to support new features set forth in a revision of a particular standard, such as a change from one NVMe Revision to the next NVMe Revision, new hardware may need to be designed and tested, which can be an expensive and time-consuming process.

It would be desirable to provide solutions to these and other issues that can be implemented within NVM data storage controllers (and other similar devices).

SUMMARY

One embodiment of the present disclosure provides a method for use by a data storage controller, the method including: receiving a register access request from a host device directed to a memory register address within a host register memory space of the data storage controller; determining whether or not the register access request is executable using hardware memory registers of the data storage controller; in response to a determination that the register access request is executable using the hardware memory registers of the data storage controller, executing the register access request using a corresponding memory register of the data storage controller; and in response to a determination that the register access request is not executable using the hardware memory registers of the data storage controller, executing the register access request using a processor of the data storage controller.

Another embodiment of the present disclosure provides a data storage controller, where the data storage controller includes: a processor; one or more memory registers; and a processing component configured to receive a register access request from a host device directed to a memory register address within a host register memory space of the data storage controller; and determine whether the register access request is executable using the one or more hardware memory registers, and if so, execute the register access request using a corresponding memory register of the data storage controller, and, if not, execute the register access request using the processor of the data storage controller.

Yet another embodiment of the present disclosure provides a data storage controller, where the data storage controller includes: a processor; one or more hardware memory registers; a register access request input controller configured to receive a register access request from a host device directed to a memory register address within a host register memory space of the data storage controller; a determination controller configured to determine whether or not the register access request is executable using the one or more hardware memory registers; a hardware execution routing circuit configured to route the register access request to the hardware memory registers for execution using a corresponding memory register in response to a determination that the register access request is executable using the one or more hardware memory registers; and a processor execution routing circuit configured to route the register access request to the processor for execution using the processor in response to a determination that the register access request is not executable using the one or more hardware memory registers.

Yet another embodiment of the present disclosure provides an apparatus for use with a data storage controller, comprising: means for receiving a register access request from a host device directed to a memory register address within a host register memory space of the data storage controller; means for determining whether the register access request is executable using hardware memory registers of the data storage controller; and means, responsive to a determination that the register access request is executable using hardware memory registers of the data storage controller, for executing the register access request using a corresponding memory register of the data storage controller, and for executing the register access request using a processor of the data storage controller otherwise.

BRIEF DESCRIPTION OF THE DRAWINGS

The subject matter described herein will now be explained with reference to the accompanying drawings of which:

FIG. 6 illustrates a set of exemplary NVMe host memory registers maintained within an NVMe data storage controller.

DETAILED DESCRIPTION

Figure 1:
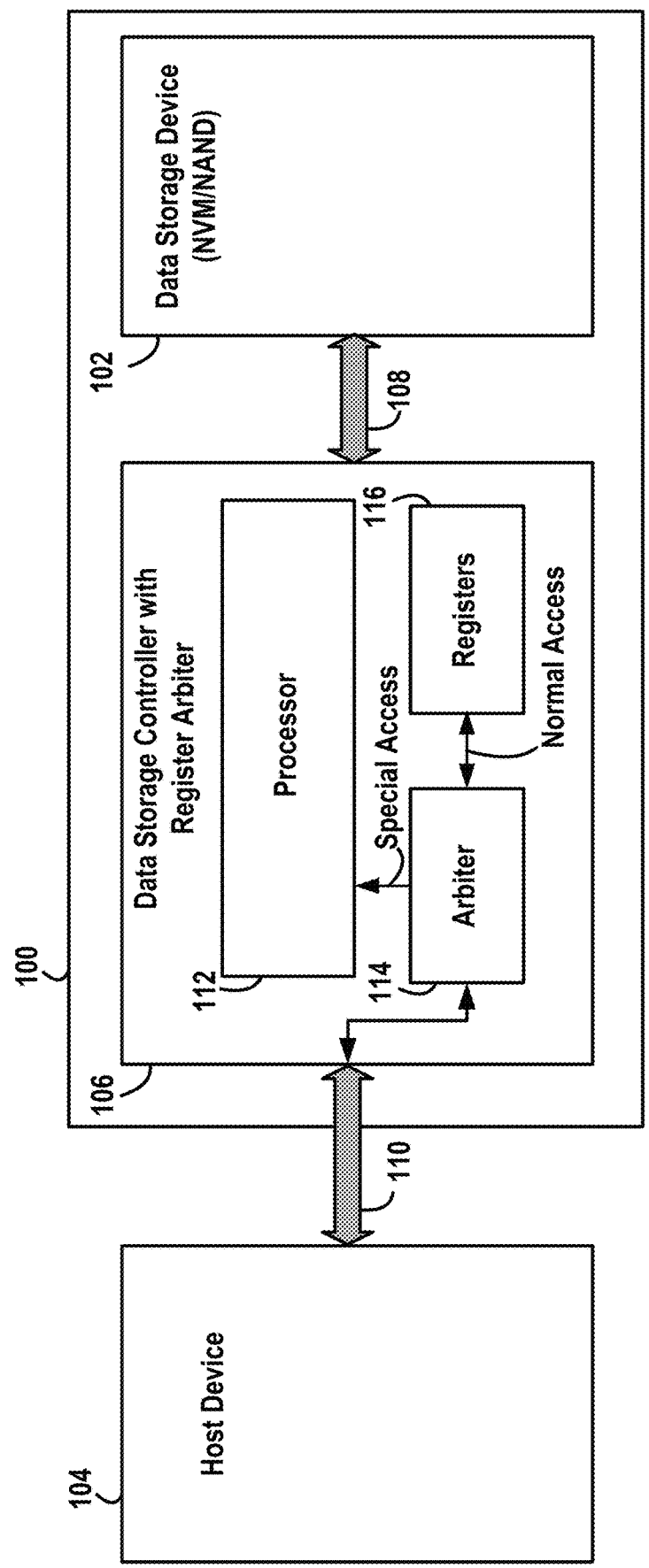
FIG. 1 illustrates a system having a data storage controller and a data storage device (such as a NAND), where the data storage controller is equipped to process certain memory register transaction requests from a host using software and/or firmware rather than hardware.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Overview

Aspects of the present disclosure provide various apparatus, devices, systems and methods for controlling host access to memory registers using a data storage controller. The main examples herein relate to data storage devices or data storage apparatus, where the device or apparatus may be a solid state device (SSD) such as a solid state drive. In many examples, the SSD includes a non-volatile memory (NVM) such as a NAND array. Some examples herein relate to NVM storage systems configured for use with the NVM Express (NVMe) system, wherein an NVM data storage controller (i.e. a device controller) is configured to control access to an NVM such as a NAND using NVMe protocols. See, again, the NVM Express standard, Revision 1.3a, Oct. 24, 2017. However, aspects described herein are applicable to other data storage systems or protocols.

As noted in the Introduction Section above, issues may arise in the development and design of NVM data storage controllers (such as NVMe controllers) when the standard changes to support new or different features. To support new features set forth in a revision of an NVM standard, new hardware for the data storage controller may need to be designed and tested, which can be an expensive and time-consuming process. Moreover, changes that might be made in a future version of the standard cannot be known generally in advance. One challenge, therefore, is to design a data storage controller platform configured so that unknown future standard changes may be implemented in software and/or firmware, rather than requiring changes to the hardware. Herein, exemplary systems, methods and apparatus are provided for adding new registers to a register address space to accommodate new features without changing the controller hardware (especially for use in cases where the new features require new hardware registers that are mapped in previous standard version to reserved address space).

As will be explained, NVM data storage controllers are described herein that are configured to emulate hardware registers in software and/or firmware. In illustrative embodiments, the host memory register address space is separated or otherwise distinguished by an arbiter (e.g. a multiplexer component installed within the data storage controller) and all inbound register accesses from the host are arbitrated. Regular register accesses by the host are directed by the arbiter along a regular hardware read path within the data storage controller. A regular access request is an access to a register that is mapped by the data storage controller to a register address that is not reserved. (These regular or normal requests are also referred to herein as requests that are "executable" using the hardware memory registers of the data storage controller.) Other transactions, such as writes to, or reads from, an unmapped/undefined or reserved address space, are instead directed by the arbiter to the processor of the data storage controller for handling by software running on the processor or by firmware associated with the processor. (These special or non-normal requests are also referred to herein as requests that are "not executable" using the hardware memory registers of the data storage controller.) Hence, in one aspect, a determination is made whether a register access request is executable using hardware memory registers of the data storage controller, and if so, the register access request is executed using a corresponding memory register of the data storage controller, and, if not, the register access request is executed using a processor of the data storage controller.

In this manner, new host standard registers (added due to changes in the standard, such as changes to the NVMe standard) may be implemented via software (and/or firmware) rather than hardware. The software and/or firmware emulates the functions of the new standard registers. As such, the data storage controller is capable of complying with new standard requirements (or other changes that might affect the memory registers) without a need to change the hardware of the data storage controller.

Herein, a memory register address is considered to be "mapped" if the data storage controller is configured to associate a logical address provided by the host with a physical register within the memory of the data storage controller. A mapped address is therefore allocated to the host for access by the host. An "undefined" or "unmapped" memory register address is an address that is not mapped or associated with a physical register within the memory of the data storage controller. A mapped address is therefore not allocated to the host. A memory register address is considered herein to be "reserved" if it is mapped to physical address but has no defined or specified function. A reserved address is therefore allocated to the host but has no currently specified function. An "unreserved" address is a mapped address that has a specified function. That is, a reserved address is one that is allocated to the host and has a specified or defined function. Memory access requests that are mapped and not reserved are considered herein to be executable by the hardware memory registers. Memory access requests that are unmapped or are mapped to a reserved address are considered herein to be not executable by the hardware memory registers, and hence are sent to the processor.

A register access request directed to a memory register address that is mapped and not reserved within the physical memory of the data storage controller also may be referred to herein as a request of a first type (i.e. executable). A register access request directed to a memory register address that is either unmapped (undefined) or is reserved within the physical memory of the data storage controller may be referred to herein as a request of a second type (i.e. non-executable). Furthermore, note that, in accordance with the hardware register emulation systems and procedures described herein, the host may view a particular memory address as being unreserved (because the host is programmed with a newer version of specification), whereas the hardware of the data storage controller may view the same memory address as being reserved (because the hardware of the data storage controller was configured under an older version of the specification when the address was still reserved).

Exemplary Data Storage Controller Embodiments

FIG. 1 illustrates, at a high level, a data storage system 100 configured to controlling access to a data storage device (such as an NVM employing NAND technology) 102 by a host device 104. For a NAND write operation, the data storage system 100 receives data from the host device 104 and stores the data in the data storage device 102 under the control of a data storage controller 106 (which may also referred to as a memory controller). The controller 106 and its components may be configured using any suitable technology and may be, for example, a physical hardware circuit or a logical controller formed of functional modules. Data and commands may be routed between the data storage controller 106 and the data storage device 102 along an internal bus 108. Data and commands may be routed between the host device 104 and the data storage controller 106 along an external bus 110. These operations may be operated under the control of a processor 112. In addition to controlling the reading/writing of data from/to the NAND 102, the data storage controller 106 controls access by the host to physical memory registers 116 within the data storage controller 106. As shown, an arbiter 114 is provided within the data storage controller 106 that receives register access requests or transactions from the host (via bus 110 and various intervening components, such as a PCIe/MAC/PHY interface, discussed below) and determines whether the transactions should be sent directly to the registers 116 via normal hardware access channels (as is the usual case) or should be instead routed to the processor 112 for special handing via software and/or firmware.

In particular, the arbiter 114 of FIG. 1 determines whether the memory register transaction is a "normal" transaction (e.g. the access is to a defined area with a correct transaction size and a correct access permission) or a "special" access transaction (e.g. the access has an unsupported transaction size or is to a reserved area of memory or the access is seeking to write to a read-only register). If the transaction is a normal "first type" transaction, the transaction is sent to the registers 116 via the normal access channels. If the transaction is a special "second type" transaction, the transaction is sent to the processor 112 for handling by software running on the processor. The processor 112 decides or determines how to respond to the special request by analyzing transaction information received from the arbiter 114. If the data storage controller determines that the memory register transaction is a normal transaction, the transaction is therefore determined to be executable by the hardware registers. If the data storage controller determines that the memory register transaction is a special transaction, the transaction is therefore determined to not be executable by the hardware registers.

By way of example, the access request (transaction) may include an attribute, parameter, or other suitable information (herein referred to as a memory register area attribute) that designates or is representative of the area of memory the transaction is direct to. If the memory access area attribute designates a memory area that is (a) mapped within a defined memory space of the data storage controller and is (b) not designated as reserved, then the access request (transaction) is deemed to be a normal access attempt (e.g. "first type"). As such, the access request (transaction) is handled by hardware. If the memory access area attribute instead designates a memory area that is (a) not within the memory area mapped within the defined memory space or (b) designates a memory area that is marked as reserved, then the access request (transaction) is deemed to be a non-standard (special) access attempt (e.g. "second type"). As such, the access request (transaction) is handled by the processor.

As another example, the access request (transaction) may include an attribute, parameter, or other suitable information (herein referred to as a transaction size attribute) that designates or is representative of the size of transaction (e.g. the number of bytes or pages). If the transaction size attribute designates a size that is a permissible (i.e. supported) transaction size, then the access request (transaction) is deemed to be a normal access attempt (e.g. "first type") and is handled by hardware. If the transaction size attribute instead designates a size that is not permissible (e.g. too large or a size that is otherwise unsupported), then the access request (transaction) is deemed to be a non-standard (special) access attempt (e.g. "second type") and is routed to the processor for special handling.

As yet another example, the access request (transaction) may include an attribute, parameter, or other suitable information (herein referred to as an access permission attribute) that designates or is representative of a type of access that the transaction seeks (e.g. read access or write access, for which permission might be needed). If the access type attribute designates a type of transaction that is permissible (such as a read to a read-only register), then the access request (transaction) is deemed to be a normal access attempt (e.g. "first type") and is handled by hardware. If the permission attribute instead designates a type of transaction that is not permissible (e.g. a write to a read-only register), then the access request (transaction) is deemed non-standard (special) (e.g. "second type") and is routed to the processor for special handling.

Figure 2:
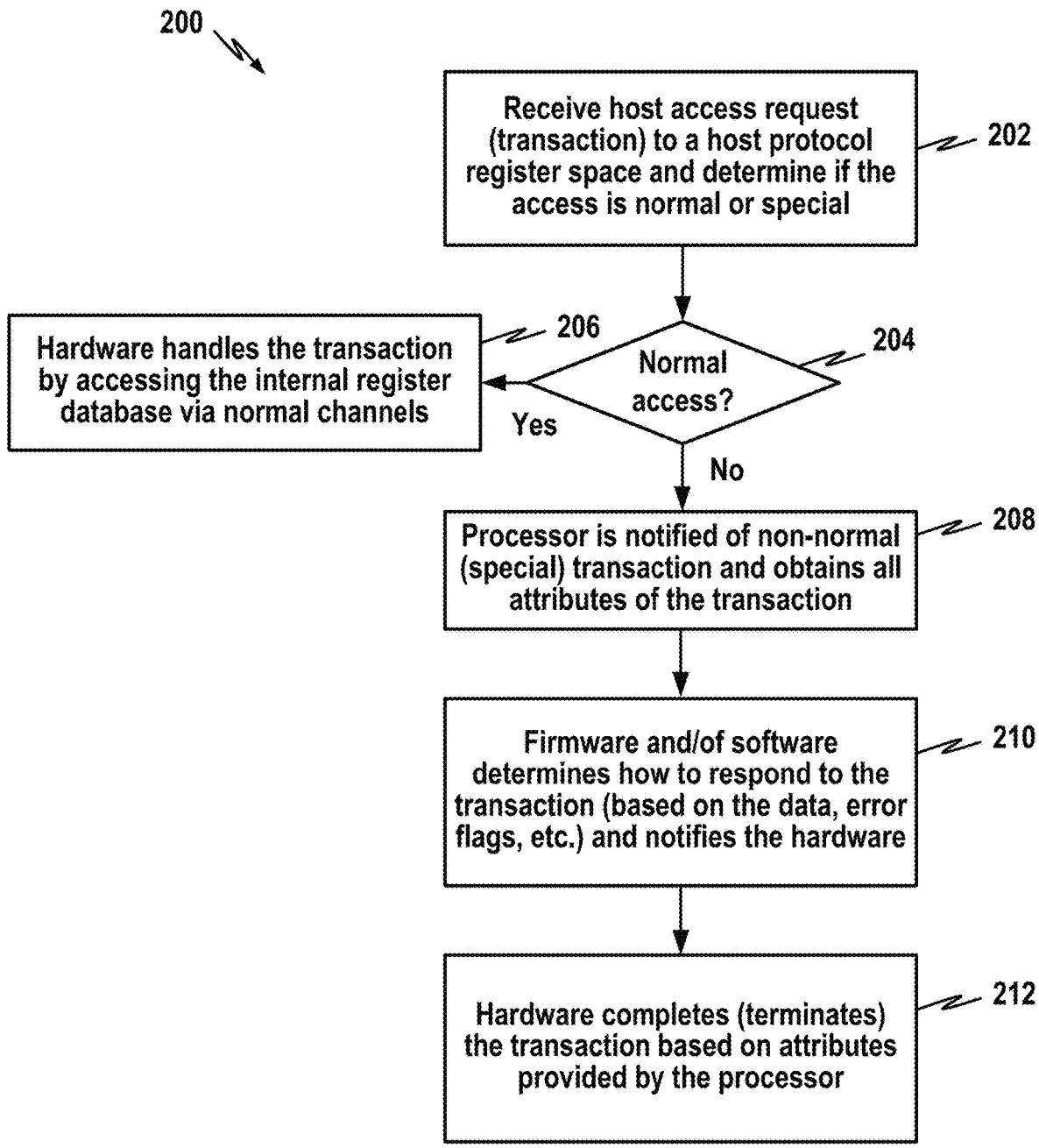
FIG. 2 is a flow chart summarizing exemplary operations that may be performed by an NVM data storage controller to distinguish between normal memory register requests for sending to hardware registers and special requests for handling via software and/or firmware.

FIG. 2 summarizes some of these features via a flowchart 200. Briefly, at block 202, the data storage controller receives a host access request (transaction) from the host to a host protocol register space and determines if the access is normal or special (by, for example, using the criteria noted above). A special transaction may be any transaction that has parameters that indicate that the corresponding hardware register functionality might have changed from a previous version (such as a transaction addressed to a previously-reserved portion of register memory). The determination at block 202 may be made by the aforementioned arbiter. If, at decision block 204, the access is determined to be normal, then, at block 206, the hardware of the data storage controller processes or otherwise handles the transaction by accessing the internal register database via normal channels. Otherwise, beginning at block 208, the processor of the data storage controller handles the transaction. That is, at block 208, the processor is notified of the non-normal (special) transaction and obtains all attributes of the transaction. At block 210, firmware and/or software within of the data storage controller determines how to respond to the transaction (based on the data, error flags, etc.) and notifies the hardware of the data storage controller. At block 212, the hardware of the data storage controller completes (i.e. terminates) the transaction based on attributes provided by the processor (i.e. the hardware receives any information from the software and/or firmware needed to complete the transaction back to the host).

As noted, at block 210, the firmware and/or software within of the data storage controller determines how to respond to the transaction that was routed to the processor. Consider a simplified example where a hardware specification has first and second releases, e.g. Version 1 and Version 2. The hardware registers of the data storage controller are configured based in the specifications and requirements of Version 1. To accommodate any changes to the registers within Version 2, the software (and/or firmware) of the data storage controller is designed or modified to addresses the changes in the hardware registers from Version 1 to Version 2. For example, the software may employ lookup tables of the like that provide a software version of the configuration of the hardware registers as specified in Version 2. That is, to accommodate Version 2, the software of the data storage controller emulates the hardware registers of Version 2 (even though the actual hardware of the data storage controller remains unchanged from its original version).

For instance, if a transaction is received from a host (where the host is programmed in accordance with Version 2) and the transaction is directed to a hardware register that was reserved in Version 1, the transaction will be routed to the processor of the data storage controller by the arbiter (since it is considered a special transaction). If the register is still marked as Reserved in Version 2, i.e. no changes have been made to that particular register from Version 1 to Version 2, the software will cause the data storage controller to respond by notifying the host that it has erroneously attempted to access a reserved register. That is, the software will cause the data storage controller to respond in the same manner as if the transaction had been sent via hardware to the reserved register and rejected by the hardware. However, if the register is no longer marked as reserved in Version 2, but now has been given a function, i.e. a change has been made to that particular register from Version 1 to Version 2, the software will cause the data storage controller to respond by performing whatever function has been specified by Version 2 (by, for example, returning the latest stored values from that register if the transaction was read transaction). Hence the software will cause the data storage controller to respond in the same manner as if the hardware of the data storage controller had been modified in accordance with Version 2 and the transaction had been sent via hardware to a hardware register configured in accordance with Version 2. In either case, the emulation operations of the software/firmware of the data storage controller are transparent to the host, which will receive the appropriate response as if the hardware registers of the data storage controller were configured in accordance with Version 2.

Figure 3:
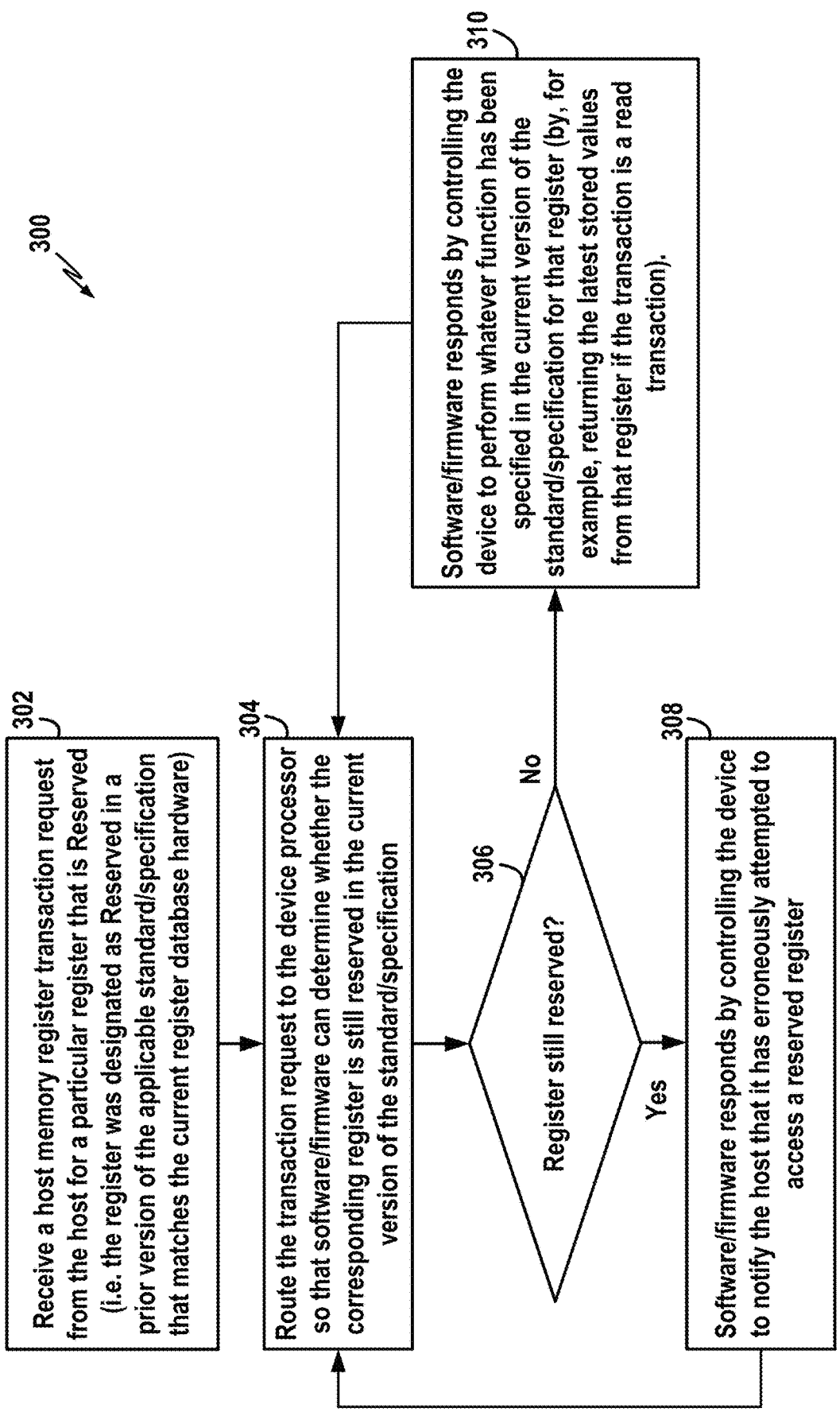
FIG. 3 is another flow chart summarizing exemplary operations that may be used by an NVM data storage controller to process memory register requests from a host to reserved memory addresses within the NVM data storage controller.

FIG. 3 summarizes the scenario just described. Briefly, at block 302, the data storage controller receives a host memory register transaction request from the host for a particular register that is Reserved (i.e. the register was designated as Reserved in a prior version of the applicable standard/specification that matches the current register database hardware). At block 304, the arbiter of the data storage controller routes the transaction request to the processor of the data storage controller so that software/firmware can determine whether the corresponding register is still reserved in the current version of the standard/specification. If the register is still reserved, as determined at decision block 306, the software/firmware responds, at block 308, by controlling the data storage controller to notify the host that it has erroneously attempted to access a reserved register. However, if the particular register is no longer reserved and has been assigned a function, the software/firmware responds, at block 310, by controlling the data storage controller to perform whatever function has been specified in the current version of the standard/specification for that particular register (by, e.g., returning the latest stored values from that register if the transaction is a read transaction).

For the particular example of NVMe Revision 1.3, a request to write to a reserved area is ignored by the data storage controller without returning an error, and a read request from the same address returns zeros without returning an error. Hence, in a hypothetical Revision 1.4 of the NVMe standard, if a request is made by the host to write to an area that is still reserved under Revision 1.4, the software/firmware of the data storage controller would respond in the same manner as in Revision 1.3 by ignoring writes and returning all zeros for reads. However, if the hypothetical Revision 1.4 changes a particular register from reserved to unreserved and gives that register a function, the software/firmware would respond accordingly by, for example, looking up the appropriate response for Revision 1.4 from its lookup tables. For instance, a request to write to a new configuration register (implemented within a previously-reserved area) results with the data stored in a software-controlled database (and with the firmware acting accordingly), so that a read request from the same address then returns the last written value (as expected by the host). A request to write to a new read-only register (implemented within a previously-reserved area) may be ignored without returning an error and so a read request from the same address would return the relevant internal status.

As another general example, if a transaction is received from a Version 2 host that is directed to a portion of memory that was undefined in Version 1, the transaction will be routed to the processor of the data storage controller and, if the portion of memory is still undefined in Version 2, the software will cause the data storage controller to respond by notifying the host that is has erroneously attempted to access undefined memory. However, if the portion of memory is now defined within the register memory space of Version 2, the software will cause the data storage controller to respond by performing whatever function has been specified/defined for that new register in Version 2. Hence, the software will here again cause the data storage controller to respond in the same manner as if the hardware of the data storage controller had been modified in accordance with Version 2 and the transaction had been sent via hardware to a hardware register configured in accordance with Version 2.

Similar logic may be applied in cases where the arbiter routes transactions to the processor if the transaction has an "unsupported transaction size" (which may have been unsupported in Version 1 but is now supported in Version 2) or the transaction seeks to write to a "read-only register" (which may have been "read-only" in Version 1 but is now "read/write" in Version 2). In each case, the software and/or firmware of the data storage controller determines the appropriate response under Version 2 and responds accordingly. Moreover, the same logic may be applied to further revisions to the applicable specification (Version 3, Version 4, etc.) with the software/firmware of the data controller being updated for each new version (by the engineers/designers of the data storage controller) to address any hardware register changes via the aforementioned software emulation using lookup tables of the like. As explained, this may be far less expensive than modifying the hardware of the data storage controller to address each new revision to the applicable specification or standard document.

In an alternative implementation, revisions involving reserved fields may be handled inside an already-defined register. For example, an internal configuration register may be maintained within the data storage controller to hold configuration fields for each reserved bit in existing standard registers that are already defined. Each configuration field defines or specifies how to handle accesses to its corresponding bit, the access of which may be controlled, at least partially, by software and/or firmware.

As can be appreciated, some modifications of a specification or standard document from one version to another might not be of a type or nature that can be detected by the arbiter or emulated via software and/or firmware. For example, a particular register specification may be changed in such a way that transactions to that register would not be detected by the arbiter (because, e.g., the particular change would not affect the transaction size or read/write attributes). In such cases, the hardware of the data storage controller is instead modified by engineers/designers to address the changes to the standards. That is, for each new revision to a specification affecting the hardware registers, the engineers/designers of the data storage controller may review the particular changes in the specification to determine if the changes can be accommodated using the emulation techniques described herein. If the changes can be accommodated, the engineers/designers reprogram the software and/or firmware accordingly, thus avoiding the need to change the hardware of the data storage controller. If any changes cannot be accommodated, the engineers/designers may redesign the hardware as needed (while also reprogramming the software and/or firmware, if needed, to conform to the new hardware). Moreover, to avoid transaction timeouts from the host side, the data storage controller should be configured to complete any requests within the transaction timeout of the host. Hence, in some cases, it may be appropriate to modify the hardware of the data storage controller, rather than implement software and/or firmware emulation, to ensure that host timeouts are avoided.

Using this general strategy, over the lifecycle of a particular standard, several revisions (perhaps spanning a period of many years) might be accommodated in a data storage controller via software/firmware upgrades before a hardware upgrade might be needed to accommodate more significant hardware changes. For some standards, and for some devices, all revisions might be accommodated in this manner over the lifetime of the standard.

Figure 4:
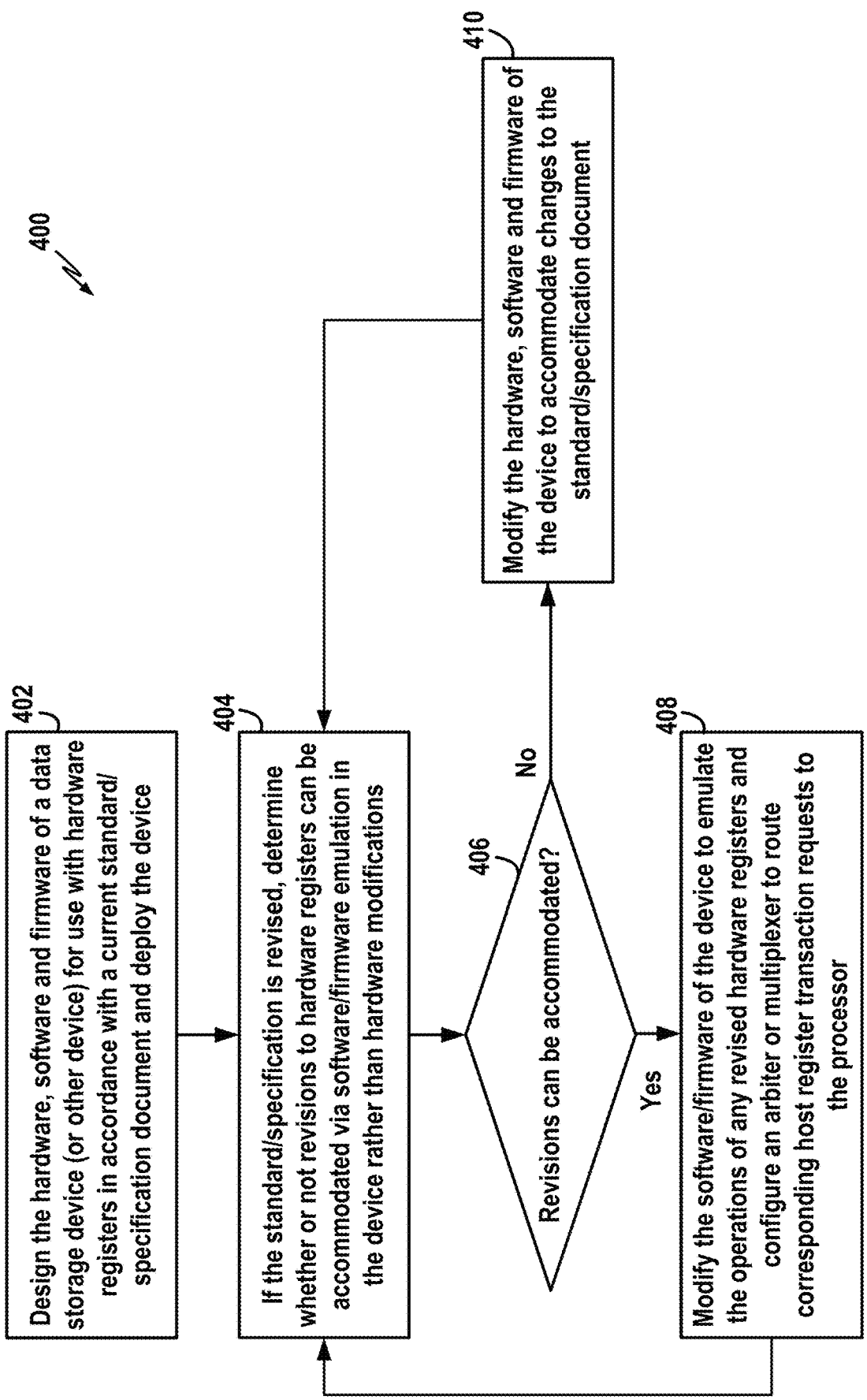
FIG. 4 is a flow chart summarizing an overall procedure for implementing revisions to a particular standard or specification that affect host memory registers maintained with an NVM data storage controller.

FIG. 4 summarizes this overall revision strategy via flowchart 400. Briefly, at 402, engineers/designers at a company that builds data storage controllers design the hardware, software and firmware of a new data storage device (or other device) for use with hardware registers in accordance with a current standard/specification document and deploy the device. If the standard/specification is revised (e.g. from Version 1 to Version 2), the engineers/designers then determine, at block 404, whether or not revisions to hardware registers of the device can be accommodated via software/firmware emulation in the device rather than hardware modifications. That is, the engineers/designers determine whether the procedures of FIG. 2 can be implemented where an arbiter directs some host register request transactions to the processor for handling by software/firmware. If the revisions can be accommodated, as determined at decision block 406, the engineers/designers modify the software/firmware of the device, at block 408, to emulate the operations of any revised hardware registers and configure an arbiter (or multiplexer) to route corresponding host register transaction requests to the processor. On the other hand, if at least one revision cannot be accommodated via software/firmware, then, at block 410, the engineers/designers modify the hardware (and software and firmware, if needed) of the device to accommodate the changes to the standard/specification document. This may require a new read only memory (ROM) or ASIC tape out (where "tape-out" is the final result of the design process for ROM-based or ASIC-based NVM controllers before they are sent for manufacturing). Such a device re-design may also be referred to as a "re-spin" or "re-spinning" the ROM or ASIC, and can be costly for the NVM controller manufacturer.

Exemplary NVMe Embodiments

Figure 5:
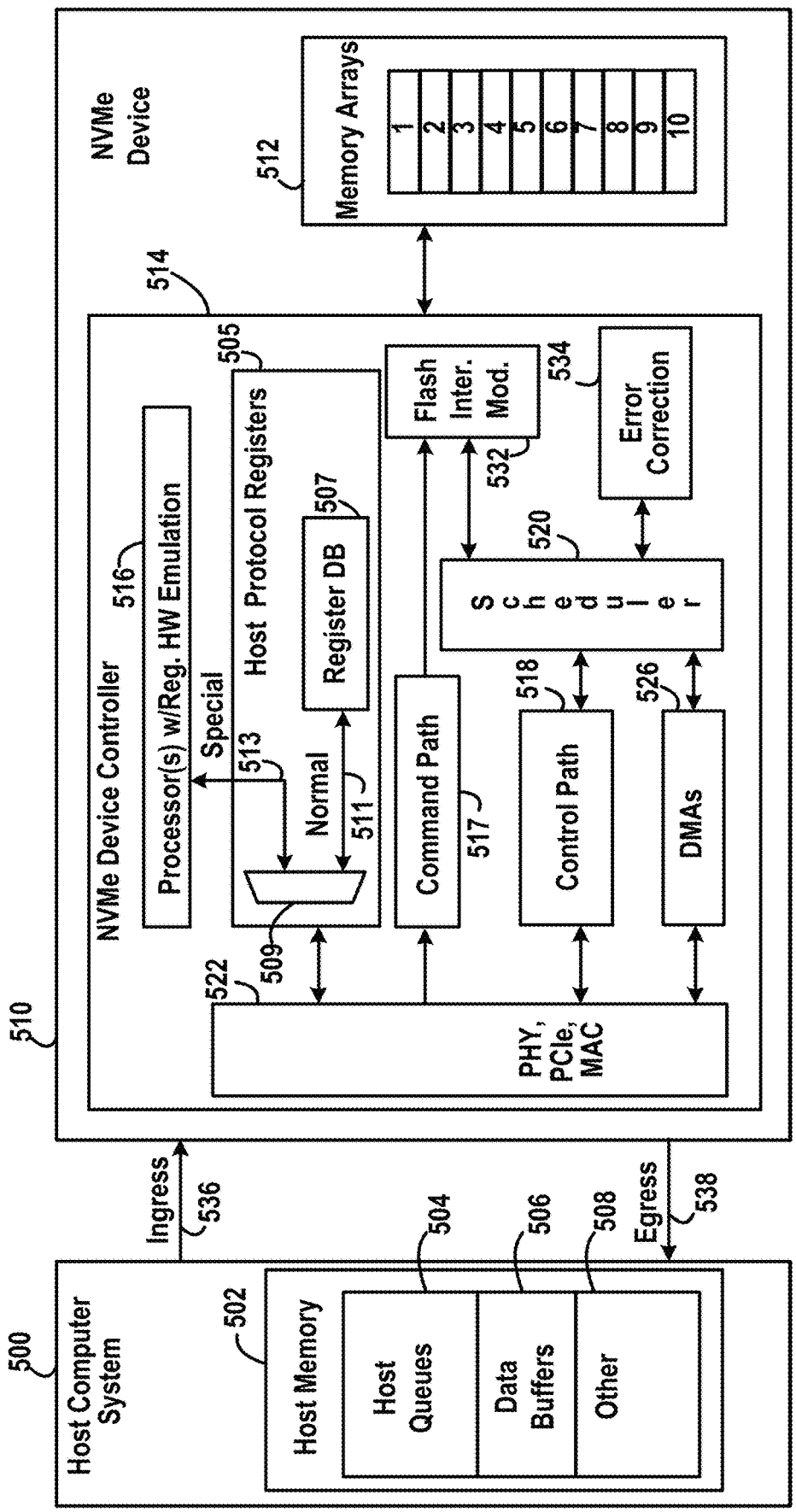
FIG. 5 illustrates a data storage system equipped for use with NVMe, where the NVMe data storage controller is equipped to process certain NVMe memory register transaction requests from a host using software and/or firmware rather than hardware.

FIG. 5 illustrates certain features of an exemplary NVMe architecture in which the above-described procedures and components may be implemented. In FIG. 5, a host device 500 may be any suitable computing platform capable of accessing memory on a storage device using NVMe procedures. For example, host device 500 may be a desktop personal computer, a laptop computer, a tablet computer, a mobile telephone, or a front end to a storage array. The host device 500 includes internal host memory 502, which in this example includes host submission and completion queues 504, data buffers 506 and other memory components 508. The host device 500 may store data in an NVMe storage device 510. The NVMe device 510 may be any suitable device that provides non-volatile memory storage for host device 500 in accordance with NVMe standards. For example, the NVMe device 510 may be a removable storage device, such as a SSD that is removably connectable to host device 500. In another example, the NVMe device 510 may be non-removable or integrated within the host device 500. In some embodiments, the host device 500 and the NVMe device 510 are communicatively connected via a PCIe bus (represented via ingress 536 and egress 538).

The NVMe storage device 510 of FIG. 5 includes an NVMe controller 514 and non-volatile memory arrays 512. The NVMe device controller 514 (which may also be referred to herein as a data storage controller) controls access to the non-volatile memory arrays 512 (such as a NAND). The NVMe controller 514 thus may be a non-volatile memory controller that implements or supports the NVMe protocol, and non-volatile memory arrays 512 may be 2D or 3D NAND flash memory. The NVMe controller 514 includes a host protocol registers component 505, which includes a hardware register database (DB) 507 and an arbiter or multiplexer 509. The host protocol register 505 is responsible for handling host access to the protocol registers 507. Normal transaction requests received from the host 500 (via a PHY/PCIe/MAC interface 522) are routed via hardware to the register DB 507 along line 511. Special transaction requests (as discussed above) are instead routed via a line 513 hardware to one or more processors 516 that provide for emulation of the register DB hardware via software and/or firmware. (Although not shown, separate volatile random access memory (RAM) or ROM may be used to store software and/or firmware). The processor(s) 516 are also responsible for the execution of Frond-End and Back-End tasks.

A command path 517 is responsible for fetching and parsing commands from the host 500 (other than register DB transactions) and queuing the commands internally. This may involve obtaining submission requests from a submission queue of the host queues 504 and routing those requests to a flash interface module 532. In addition, the command path 517 is responsible for the arbitrating and executing the commands A control path 518 is responsible for handling control messages delivered from the host 500 to the device 510 and vice versa. Among other functions, the control path 518 includes a completion queue manager (not shown) that routes completion entries received from a scheduler 520 to a completion queue within host queues 504 of the host device 500 via the PCIe/MAC/PHY interface 522. Actual pages of data to be delivered to the host device 500 (such as the result of read commands from arrays 512) are delivered using one or more DMAs 526. Additional components of the NVMe controller 514 include the flash interface module 532, which is responsible for controlling and accessing the memory arrays 512, and an error correction module 534, which is responsible for error correction. Ingress and egress from the NVMe device 510 is illustrated via arrows 536 and 538.

Note that, in an exemplary implementation, the only components that are modified relative to conventional NVMe device controller are the host protocol registers component 505 and the processor(s) 516 (as well as the software/firmware associated with the processors). The normal/special processing procedures described herein that serve to emulate hardware register revisions to NVMe standards are otherwise transparent to all other components of the NVMe device 510, as well as the host device 500. That is, only minimal changes are made to otherwise standard NVMe systems to implement the host submission queue throttling.

FIG. 6 illustrates NVMe registers 600 that may be stored or maintained in register database 507 of FIG. 5 for the example of Revision 1.3 of NVMe. That is, FIG. 6 illustrates register mapping as per NVMe Revision 1.3. Boot partition registers are present in this version, while in the previous standard version (Revision 1.2), the address space 40h to 50h was a reserved area. Without the SW/FW emulation procedures and components described herein, a product developed with hardware to implement Revision 1.2 (or earlier) would not be able to support the boot partition feature of Revision 1.3 without a hardware redesign. However, by using the aforementioned SW/FW emulation procedures, the hardware of the device need not be changed to implement the boot partition feature, only its software/firmware. Future versions of NVMe might exploit the memory area at offset 0x18 for new functions, which may then be addressed with appropriate SW/FW emulation procedures rather than hardware changes.

Thus, methods and apparatus have been described that provide for permitting current NVM products to support future versions of a host standard and, in some cases, for implementing new features via firmware. Often, firmware changes are enough to avoid a full ASIC tape-out. The procedures described herein thus may serve to reduce significantly the time to market, since ASIC tape-out can be a long process. Moreover, the techniques may reduce expenses for a full tape-out, which can be substantial.

Further Exemplary Methods and Embodiments

FIGS. 7-16 illustrate and summarize various general features of exemplary data storage controllers and methods, or procedures for use with data storage controllers.

Figure 7:
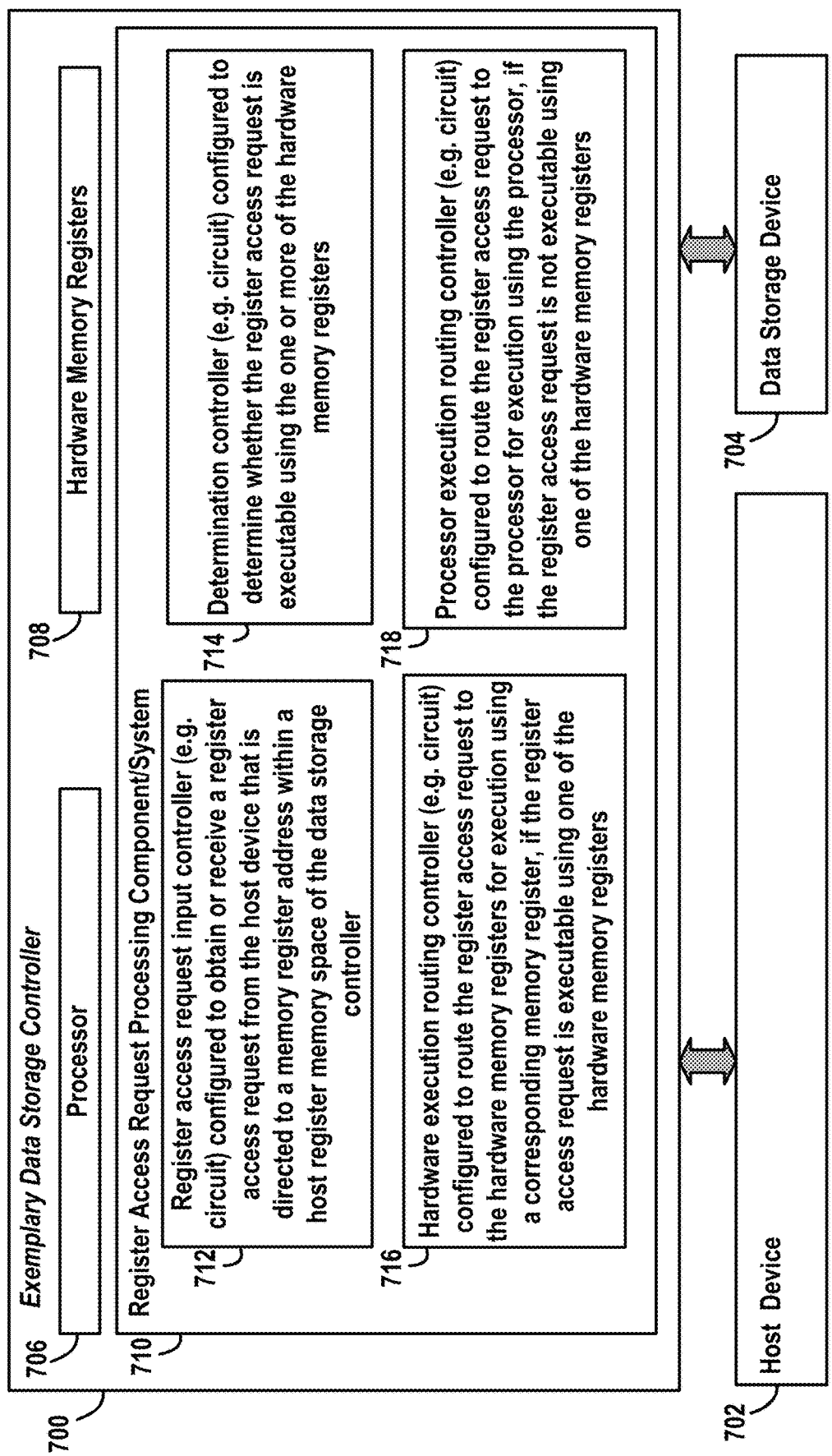
FIG. 7 is a block diagram summarizing selected features of a data storage controller equipped to process certain memory register transaction requests from a host using software and/or firmware rather than hardware.

FIG. 7 shows an exemplary data storage controller 700 (or memory controller or device controller) configured to communicate with a host device 702 and a data storage device 704, wherein the data storage controller 700 may access the data storage device 704 based on commands issued to the data storage controller 700 by the host device 702. Although many examples described herein relate to NVMe controllers for storing data within NAND devices, the data storage device 704 may be any suitable memory or storage device and is not limited to NANDs, and the data storage controller 700 may be any suitable memory controller device and is not limited to NVMe-based controllers.

The exemplary data storage controller 700 of FIG. 7 includes a processor 706 and one of more one or more hardware memory registers 708. The data storage controller 700 also includes a register access request processing component/system 710 having a register access request input controller (e.g. circuit) 712 configured to obtain or receive a register access request from a host device directed to a memory register address within a host register memory space of the data storage controller. The register access request processing component/system 710 also includes a determination controller (e.g. circuit) 714 configured to determine whether the register access request is executable using the one or more of the hardware memory registers. The determination controller (e.g. circuit) 714 may correspond, in some examples, to the arbiter 509 of FIG. 5. The register access request processing component/system 710 further includes a hardware execution routing controller (e.g. circuit) 716 configured to route or send the register access request to the hardware memory registers 708 for execution using a corresponding memory register, if the register access request is executable using one of the hardware memory registers. The register access request processing component/system 710 additionally includes a processor execution routing controller (e.g. circuit) 718 configured to route or send the register access request to the processor for execution using the processor, if the register access request is not executable using one of the hardware memory registers.

In at least some examples, means may be provided for performing the functions illustrated in FIG. 7 and/or other functions illustrated or described herein. For example, an apparatus (e.g. data storage controller 700) may be provided for use with a host device (e.g. host 702) and a data storage device (e.g. storage device 704) where the apparatus includes: means (such as controller 712) for obtaining a register access request from a host device directed to a memory register address within a host register memory space (which, as noted, is a memory space of or within the data storage controller); means (such as determination controller 714 or arbiter 509) for determining whether the register access request is executable using hardware memory registers of the data storage controller. Means (such as controller 716) may be provided for routing or sending the register access request to the hardware memory registers for execution using a corresponding memory register, if the register access request is executable using hardware memory registers. Means (such as controller 718) may be provided for routing or sending the register access request to the processor for execution using the processor, if the register access request is executable using hardware memory registers.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms. These are just some examples of suitable means for performing or controlling the various functions.

In at least some examples, a machine-readable storage medium may be provided having one or more instructions which when executed by a processing circuit causes the processing circuit to performing the functions illustrated in FIG. 7 and/or other functions illustrated or described herein. For example, instructions may be provided for: obtaining a register access request from a host device directed to a memory register address within a host register memory space (which, as noted, is a memory space of or within the data storage controller); and for determining whether the register access request is executable using hardware memory registers of the data storage controller. Instructions may be provided for routing or sending the register access request to the hardware memory registers for execution using a corresponding memory register, if the register access request is executable using hardware memory registers. Instructions may be provided for routing or sending the register access request to the processor for execution using the processor, if the register access request is executable using hardware memory registers.

Figure 8:
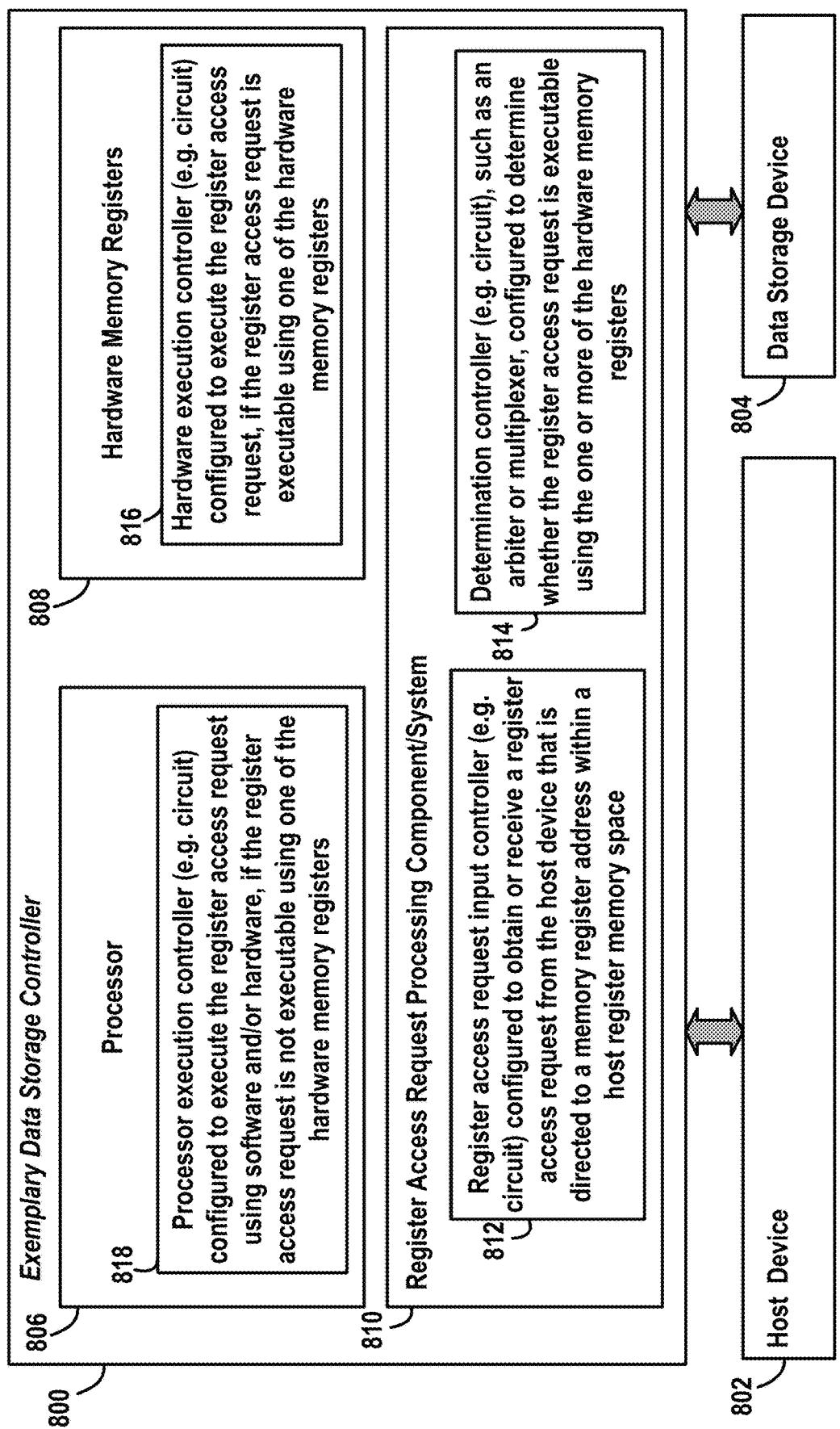
FIG. 8 is a block diagram summarizing further selected features of a data storage controller equipped to process certain memory register transaction requests from a host using software and/or firmware rather than hardware.

FIG. 8 shows another exemplary data storage controller 800 (or memory controller or device controller) configured to communicate with a host device 802 and a data storage device 804, wherein the data storage controller 800 may access the data storage device 804 based on commands issued to the data storage controller 800 by the host device 802. The exemplary data storage controller 800 of FIG. 8 again includes a processor 806 and one of more one or more hardware memory registers 808. The data storage controller 800 also includes a register access request processing component/system 810 having a register access request input controller (e.g. circuit) 812 configured to obtain or receive a register access request from a host device directed to a memory register address within a host register memory space (of the data storage controller). The register access request processing component/system 810 also includes a determination controller (e.g. circuit) 814 (such as an arbiter or multiplexer) configured to determine whether the register access request is executable using the one or more of the hardware memory registers. The hardware memory registers 808 include a hardware execution controller (e.g. circuit) 816 configured to execute the register access request, if the register access request is executable using one of the hardware memory registers. The processor 806 includes a processor execution controller (e.g. circuit) 818 configured to execute the register access request using software and/or hardware, if the register access request is not executable using one of the hardware memory registers 808.

Means may be provided for performing the functions illustrated in FIG. 8 and/or other functions illustrated or described herein. For example, an apparatus (e.g. data storage controller 800) may be provided for use with a host device (e.g. host 802 device) and a data storage device (e.g. storage device 804) where the apparatus includes: means (such as controller 812) for obtaining a register access request from a host device directed to a memory register address within a host register memory space and means (such as determination controller 814 or arbiter 509) for determining whether the register access request is executable using hardware memory registers of the data storage controller. Means (such as controller 816) may be provided for executing the register access request using a corresponding memory register of the data storage controller. Means (such as controller 818) may be provided for executing the register access request using a processor of the data storage controller.

A machine-readable storage medium may be provided having one or more instructions which when executed by a processing circuit causes the processing circuit to performing the functions illustrated in FIG. 8 and/or other functions illustrated or described herein. For example, instructions may be provided for: obtaining a register access request from a host device directed to a memory register address within a host register memory space; and for determining whether the register access request is executable using hardware memory registers of the data storage controller, and if so, for executing the register access request using a corresponding memory register of the data storage controller, and, if not, for executing the register access request using a processor of the data storage controller.

Figure 9:
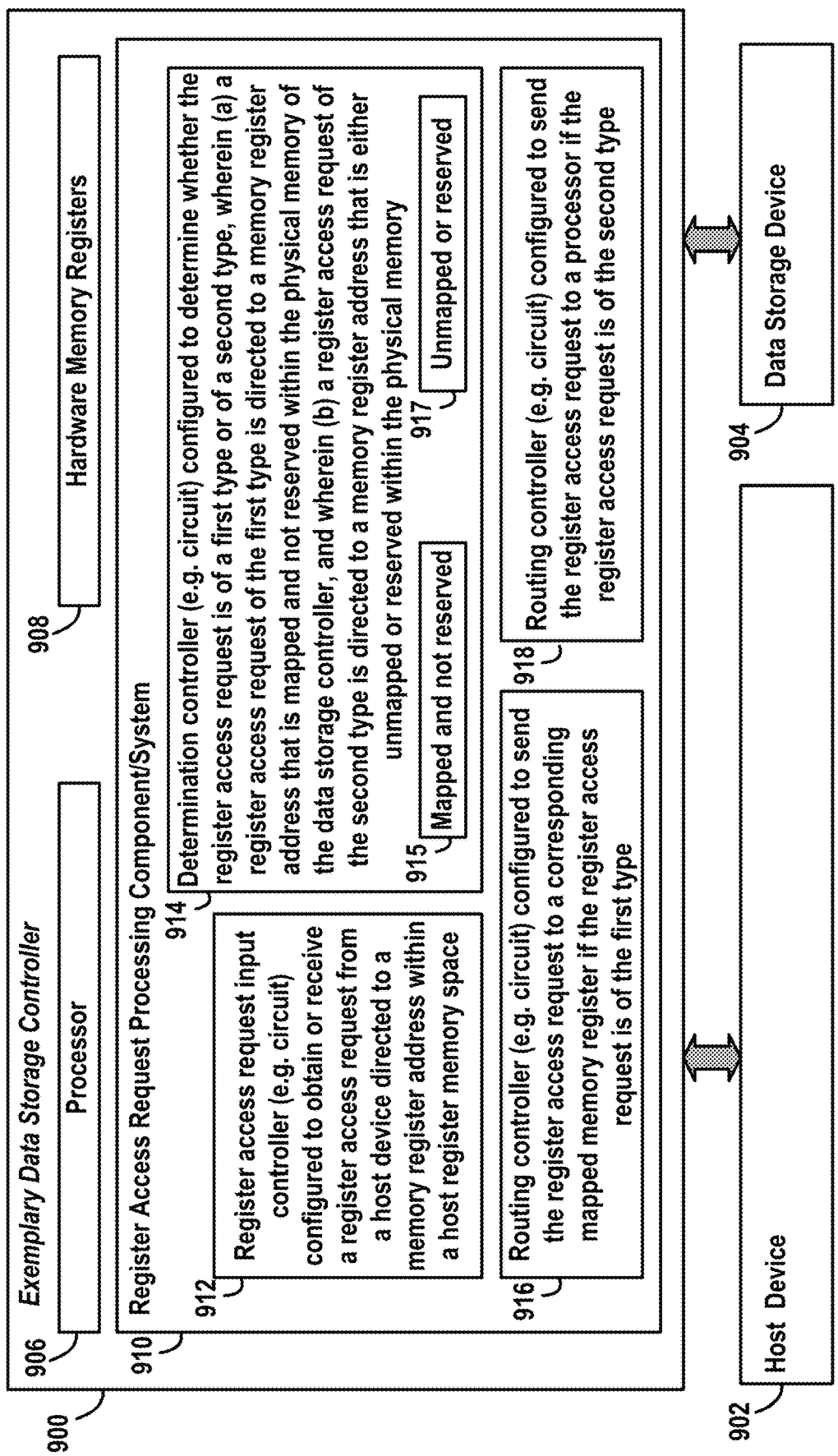
FIG. 9 is a block diagram summarizing still more selected features of a data storage controller equipped to process certain memory register transaction requests from a host using software and/or firmware rather than hardware.

FIG. 9 shows yet another exemplary data storage controller 900 (or memory controller or device controller) configured to communicate with a host device 902 and a data storage device 904, wherein the data storage controller 900 may access the data storage device 904 based on commands issued to the data storage controller 900 by the host device 902. The exemplary data storage controller 900 of FIG. 9 includes a processor 906 and one of more one or more memory registers 908. The data storage controller 900 also includes a register access request processing component/system 910 having a register access request input controller (e.g. circuit) 912 configured to obtain or receive a register access request from a host device directed to a memory register address within a host register memory space (of the data storage controller). The register access request processing component/system 910 also includes a determination controller (e.g. circuit) 914 configured to determine whether the register access request is of a first type or of a second type, wherein (a) a register access request of the first type is directed to a memory register address that is mapped and not reserved within the physical memory of the data storage controller, and wherein (b) a register access request of the second type is directed to a memory register address that is either unmapped or reserved within the physical memory. Controller 914 may include a component 915 for determining if the memory register address (that the request is directed to) is mapped and not reserved within the physical memory of the data storage controller, and a component 917 for determining if memory register address (that the request is directed to) is either unmapped or reserved within the physical memory. The register access request processing component/system 910 further includes routing controller (e.g. circuit) 916 configured to send the register access request to a corresponding mapped memory register if the register access request is of the first type and another routing controller (e.g. circuit) 918 configured to send the register access request to a processor if the register access request is of the second type. The determination controller (e.g. circuit) 914 may correspond, in some examples, to the arbiter 509 of FIG. 5. The routing controller (e.g. circuit) 916 may include, in some examples, to the normal request routing line(s) 511 of FIG. 5. The routing component 918 may include, in some examples, to the special request routing line(s) 513.

Means may be provided for performing the functions illustrated in FIG. 9 and/or other functions illustrated or described herein. For example, an apparatus (e.g. data storage controller 900) may be provided for use with a host device (e.g. host 902) and a data storage device (e.g. storage device 904) where the apparatus includes: means (such as controller 912) for obtaining a register access request from a host device directed to a memory register address within a host register memory space (which, as noted, is a memory space of or within the data storage controller); means (such as determination controller 914 or arbiter 509) for determining whether the register access request is of a first type or of a second type, wherein a register access request of the first type is directed to a memory register address that is mapped and not reserved within the physical memory of the data storage controller, and wherein a register access request of the second type is directed to a memory register address that is either unmapped or reserved within the physical memory of the data storage controller; means (such as routing controller 916) for sending the register access request to a corresponding mapped memory register within the data storage controller if the register access request is of the first type; and means (such as routing controller 918) for sending the register access request to a processor of the data storage controller if the register access request is of the second type.

The means for determining whether the register access request is of the first type or of the second type may include: means for obtaining a memory register area attribute from the register access request; means for determining that the register access request is of the first type if the memory access area attribute designates a memory area that is (a) mapped within a defined memory space of the data storage controller and (b) not designated as reserved; an means for determining that the register access request is of the second type if the memory access area attribute designates a memory area that is (a) not within the memory area mapped within the defined memory space or (b) designates a memory area that is marked as reserved. The means for determining whether the register access request is of the first type or of the second type may include: means for obtaining a transaction size attribute from the register access request; means for determining that the register access request is of the first type if the transaction size attribute corresponds to a permissible transaction size defined within the data storage controller; and means for determining that the register access request is of the second type if the transaction size attribute does not correspond to the permissible transaction size.

The means for determining whether the register access request is of the first type or of the second type may include: means for obtaining an access type attribute from the register access request; means for determining that the register access request is of the first type if the access type attribute corresponds to a permissible access within the data storage controller; and means for determining that the register access request is of the second type if the access type attribute does not correspond to the permissible access within the data storage controller. The access type attribute may indicate that the register access request is a read request and the permissible access within the data storage controller to a corresponding mapped physical memory register is for read access, where the register access request is then determined to be of the first type because the access type attribute corresponds to the permissible access. The access type attribute may indicate that the register access request is a read request but the permissible access within the data storage controller to a corresponding mapped physical memory register is for write access, where the register access request is then determined to be of the second type because the access type attribute does not correspond to the permissible access.

The apparatus may further include means for processing the register access request using hardware of the data storage controller if the register access request is sent to the corresponding mapped memory register; and means for processing the register access request using software running on the processor if the register access request is sent to the processor. The means for sending the register access request to the processor may include means for sending register access request attributes along with the register access request to the processor. The means for processing the register access request using software may operate based, at least in part, on the register access request attributes.

For a register access request that is directed to a register that is either unmapped or reserved within the physical memory of the data storage controller, the software may determine whether the register is also either unmapped or reserved within the host memory space based on information programmed into the data storage controller and, if so, the data storage controller rejects the register access request as erroneous. For a register access request that is directed to the register that is either unmapped or reserved within the physical memory of the data storage controller, if the software determines that the register is mapped within the host memory space, the software of the data storage controller processes the register access request in accordance with pre-programmed operations to complete the register access request.

A machine-readable storage medium may be provided having one or more instructions which when executed by a processing circuit causes the processing circuit to performing the functions illustrated in FIG. 9 and/or other functions illustrated or described herein. For example, instructions may be provided for: obtaining a register access request from a host device directed to a memory register address within a host register memory space; determining whether the register access request is of a first type or of a second type, wherein a register access request of the first type is directed to a memory register address that is mapped and not reserved within the physical memory of the data storage controller, and wherein a register access request of the second type is directed to a memory register address that is either unmapped or reserved within the physical memory of the data storage controller; sending the register access request to a corresponding mapped memory register within the data storage controller if the register access request is of the first type; and sending the register access request to a processor of the data storage controller if the register access request is of the second type.

The instructions for determining whether the register access request is of the first type or of the second type may include: instructions for obtaining a memory register area attribute from the register access request; instructions for determining that the register access request is of the first type if the memory access area attribute designates a memory area that is (a) mapped within a defined memory space of the data storage controller and (b) not designated as reserved; an instructions for determining that the register access request is of the second type if the memory access area attribute designates a memory area that is (a) not within the memory area mapped within the defined memory space or (b) designates a memory area that is marked as reserved. The instructions for determining whether the register access request is of the first type or of the second type may include: instructions for obtaining a transaction size attribute from the register access request; instructions for determining that the register access request is of the first type if the transaction size attribute corresponds to a permissible transaction size defined within the data storage controller; and instructions for determining that the register access request is of the second type if the transaction size attribute does not correspond to the permissible transaction size.

The instructions for determining whether the register access request is of the first type or of the second type may include: instructions for obtaining an access type attribute from the register access request; instructions for determining that the register access request is of the first type if the access type attribute corresponds to a permissible access within the data storage controller; and instructions for determining that the register access request is of the second type if the access type attribute does not correspond to the permissible access within the data storage controller. The access type attribute may indicate that the register access request is a read request and the permissible access within the data storage controller to a corresponding mapped physical memory register is for read access, where the register access request is then determined to be of the first type because the access type attribute corresponds to the permissible access. The access type attribute may indicate that the register access request is a read request but the permissible access within the data storage controller to a corresponding mapped physical memory register is for write access, where the register access request is then determined to be of the second type because the access type attribute does not correspond to the permissible access.

The apparatus may further include instructions for processing the register access request using hardware of the data storage controller if the register access request is sent to the corresponding mapped memory register; and instructions for processing the register access request using software running on the processor if the register access request is sent to the processor. The instructions for sending the register access request to the processor may include instructions for sending register access request attributes along with the register access request to the processor. The instructions for processing the register access request using software may operate based, at least in part, on the register access request attributes.

For a register access request that is directed to a register that is either unmapped or reserved within the physical memory of the data storage controller, the instructions may determine whether the register is also either unmapped or reserved within a host memory space based on information programmed into the data storage controller and, if so, the data storage controller rejects the register access request as erroneous. For a register access request that is directed to the register that is either unmapped or reserved within the physical memory of the data storage controller, if the instructions determines that the register is mapped within the host memory space, the software of the data storage controller processes the register access request in accordance with pre-programmed operations to complete the register access request.

Figure 10:
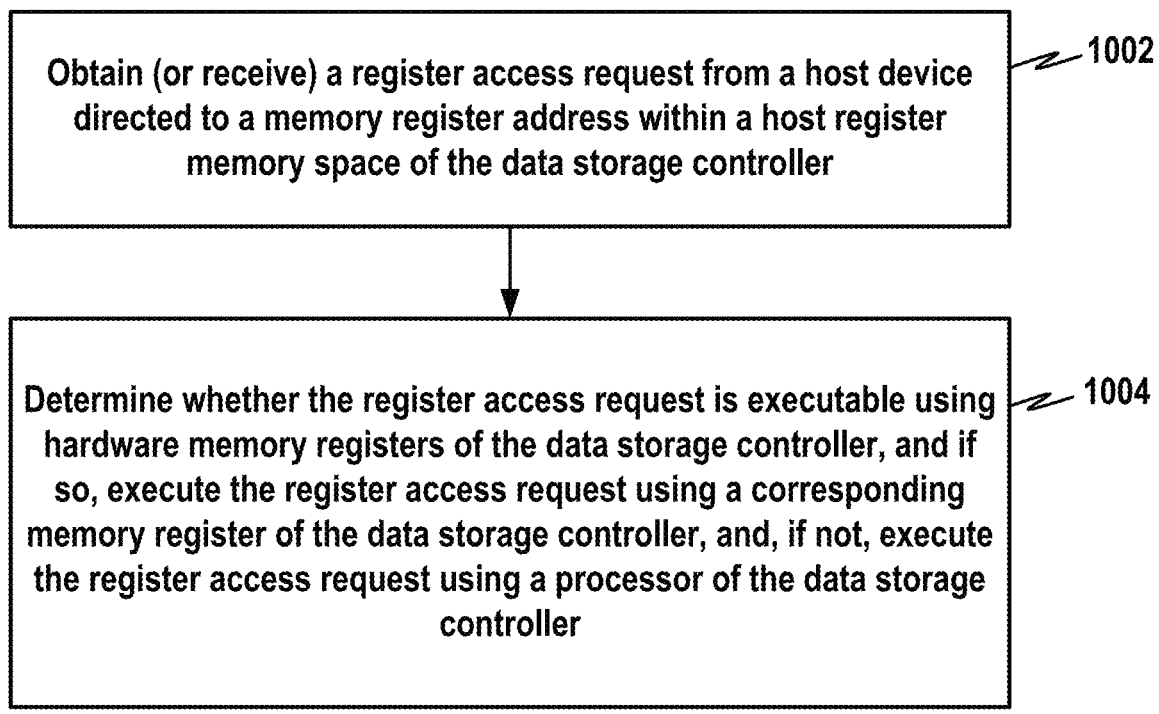
FIG. 10 is a flow chart summarizing selected operations of a data storage controller or other suitable device equipped to process certain memory register transaction requests from a host using software and/or firmware rather than hardware.

FIG. 10 broadly summarizes exemplary operations 1000 for use by or with a data storage controller or other suitable device to process register access requests. Briefly, at block 1002, the data storage controller obtains (or receives) a register access request from a host device directed to a memory register address within a host register memory space of the data storage controller. At block 1004, the data storage controller determines whether the register access request is executable using hardware memory registers of the data storage controller, and if so, executes the register access request using a corresponding memory register of the data storage controller, and, if not, executes the register access request using a processor of the data storage controller.

Means may be provided for performing the functions illustrated in FIGS. 7, 9 and 10 and/or other functions illustrated or described herein. An apparatus (e.g. data storage controller 700) may be provided for use with a host device (e.g. host 702) and a data storage device (e.g. storage device 704) where the apparatus includes: means (such as controller 712) for obtaining a register access request from a host device directed to a memory register address within a host register memory space (of the data storage controller). Additionally, means (such as register access request processing component/system 710) may be provided for determining whether the register access request is executable using hardware memory registers of the data storage controller, and if so, for executing the register access request using a corresponding memory register of the data storage controller, and, if not, for executing the register access request using a processor of the data storage controller.

Still further, means may be provided, responsive to a determination that the register access request is executable using hardware memory registers of the data storage controller, for executing the register access request using a corresponding memory register of the data storage controller (such as component 716), and that operate for executing the register access request using a processor of the data storage controller otherwise (such as component 718). The means for determining whether the register access request is executable using the hardware memory registers may include: means (such as component 915 of controller 914) for determining whether the register access request is directed to a memory register address that is both mapped and not reserved within a physical memory of the data storage controller; and means (such as component 917 of controller 914) for determining whether the register access request is directed to a memory register address that is either unmapped or reserved within the physical memory of the data storage controller. Means (such as component 916) may be provided for sending the register access request to a corresponding mapped memory register within the data storage controller if the register access request is determined to be both mapped and not reserved. Means (such as component 918) may be provided for sending the register access request to the processor of the data storage controller if the register access request is determined to be either unmapped or reserved.

Instructions may be provided, which when executed by a processing circuit causes the processing circuit to perform the functions illustrated in FIGS. 7, 9 and 10 and/or other functions illustrated or described herein. For example instructions may be provided for: obtaining a register access request from a host device directed to a memory register address within a host register memory space. Instructions may be provided for determining whether the register access request is executable using hardware memory registers of the data storage controller, and if so, for executing the register access request using a corresponding memory register of the data storage controller, and, if not, for executing the register access request using a processor of the data storage controller.

Still further, instructions may be provided, responsive to a determination that the register access request is executable using hardware memory registers of the data storage controller, for executing the register access request using a corresponding memory register of the data storage controller, and that operate for executing the register access request using a processor of the data storage controller otherwise. The instructions for determining whether the register access request is executable using the hardware memory registers may include: instructions for determining whether the register access request is directed to a memory register address that is both mapped and not reserved within a physical memory of the data storage controller; and instructions for determining whether the register access request is directed to a memory register address that is either unmapped or reserved within the physical memory of the data storage controller. Instructions may be provided for sending the register access request to a corresponding mapped memory register within the data storage controller if the register access request is determined to be both mapped and not reserved. Instructions may be provided for sending the register access request to the processor of the data storage controller if the register access request is determined to be either unmapped or reserved.

Figure 11:
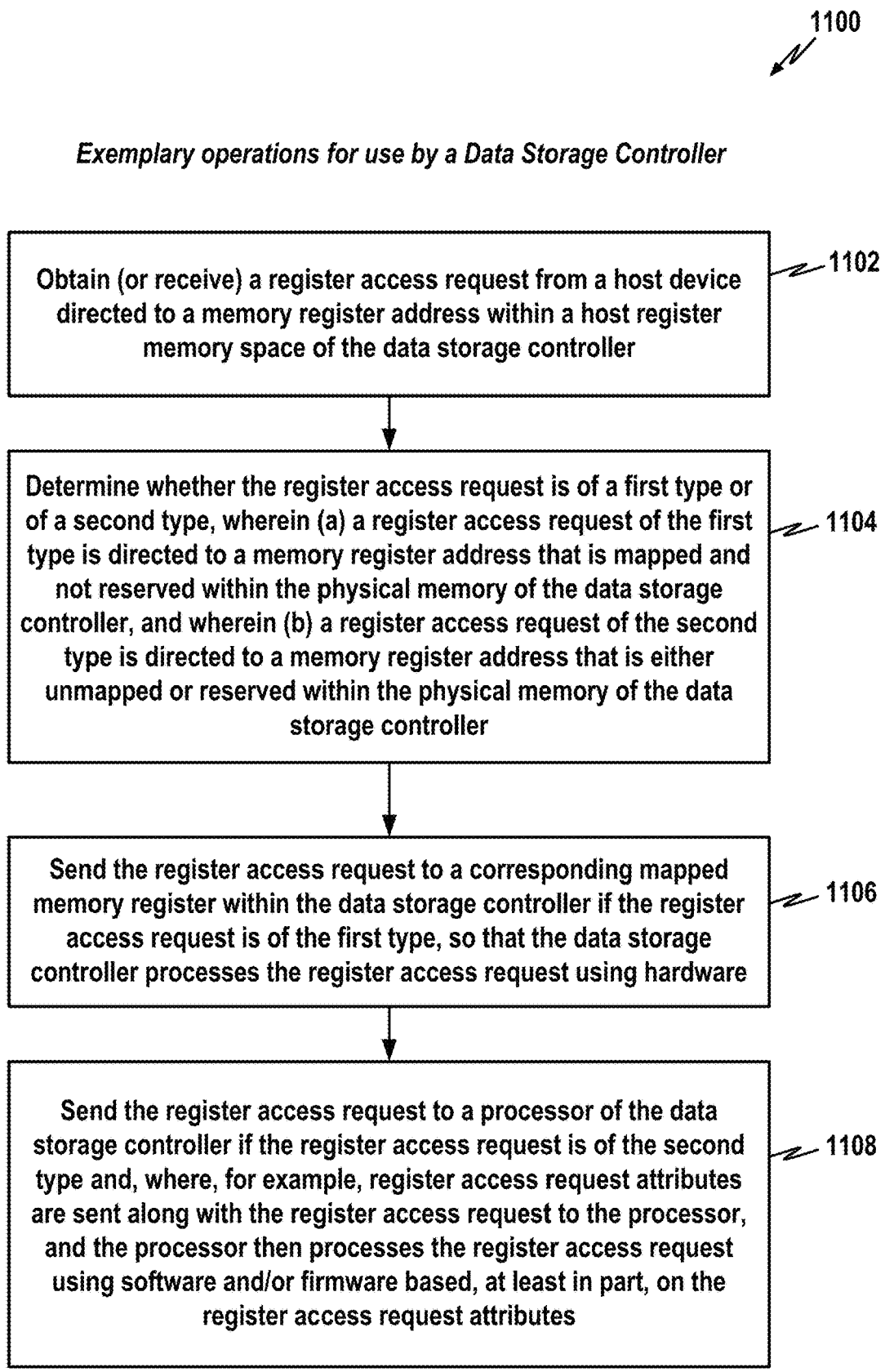
FIG. 11 is a flow chart summarizing other selected operations of a data storage controller or other suitable device equipped to process certain memory register transaction requests from a host using software and/or firmware rather than hardware.

FIG. 11 further summarizes exemplary operations 1100 for use by or with a data storage controller or other suitable device to process register access requests. Briefly, at block 1102, the data storage controller obtains (or receives) a register access request from a host device directed to a memory register address within a host register memory space of the data storage controller. At block 1104, the data storage controller determines whether the register access request is of a first type or of a second type, wherein (a) a register access request of the first type is directed to a memory register address that is mapped and not reserved within the physical memory of the data storage controller, and wherein (b) a register access request of the second type is directed to a memory register address that is either unmapped or reserved within the physical memory of the data storage controller. (An example of a reserved register address is the reserved address shown in FIG. 6). At block 1106, the data storage controller sends or routes the register access request to a corresponding mapped memory register within the data storage controller if the register access request is of the first type, so that the data storage controller processes the register access request using hardware. At block 1108, the data storage controller sends or routes the register access request to a processor of the data storage controller if the register access request is of the second type and, where, for example, register access request attributes are sent along with the register access request to the processor, and the processor then processes the register access request using software and/or firmware based, at least in part, on the register access request attributes.

Figure 12:
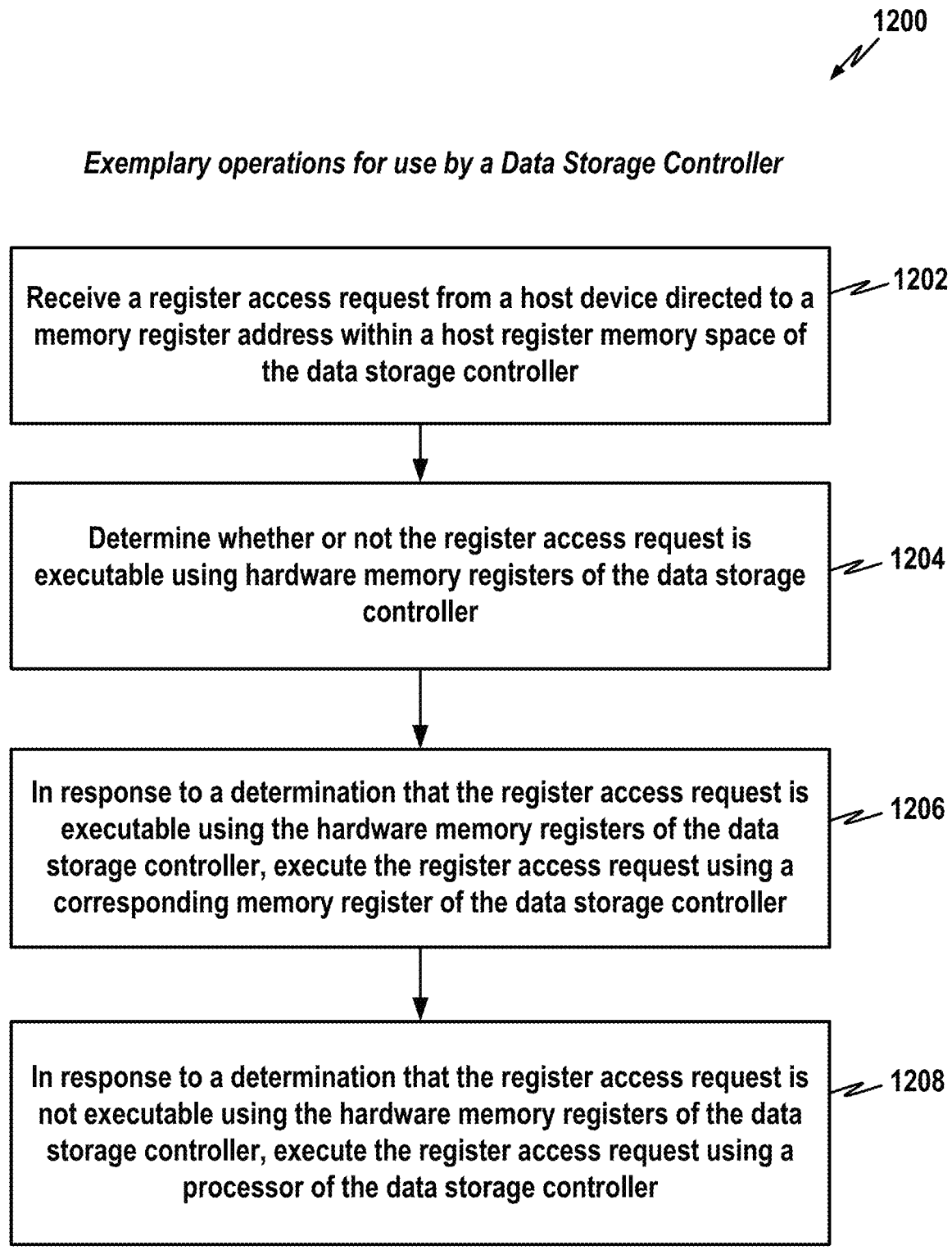
FIG. 12 is a flow chart summarizing still other selected operations of a data storage controller or other suitable device equipped to process certain memory register transaction requests from a host using software and/or firmware rather than hardware.

FIG. 12 summarizes still other exemplary operations 1200 for use by or with a data storage controller or other suitable device to register access requests. Briefly, at block 1202, the data storage controller receives a register access request from a host device directed to a memory register address within a host register memory space of (or within) the data storage controller, and, at block 1204, the data storage controller determines whether or not the register access request is executable using hardware memory registers of the data storage controller. At block 1206, in response to a determination that the register access request is executable using the hardware memory registers of the data storage controller, the data storage controller executes the register access request using a corresponding memory register of the data storage controller. At block 1208, in response to a determination that the register access request is not executable using the hardware memory registers of the data storage controller, the data storage controller executes the register access request using a processor of the data storage controller. These features were discussed above.

Means may be provided for performing the functions illustrated in FIG. 12 and/or other functions illustrated or described herein. An apparatus (e.g. data storage controller 700) may be provided for use with a host device (e.g. host 702) and a data storage device (e.g. storage device 704) where the apparatus includes: means (such as controller 712) for receiving a register access request from a host device directed to a memory register address within a host register memory space of the data storage controller; and means (such as controller 714) may be provided for determining whether or the register access request is executable using hardware memory registers of the data storage controller. Means (such as controller 716) may be provided for, in response to a determination that the register access request is executable using the hardware memory registers of the data storage controller, executing the register access request using a corresponding memory register of the data storage controller. Means (such as controller 718) may be provided for, in response to a determination that the register access request is not executable using the hardware memory registers of the data storage controller, executing the register access request using a processor of the data storage controller.

Instructions may be provided, which when executed by a processing circuit causes the processing circuit to perform the functions illustrated in FIG. 12 and/or other functions illustrated or described herein. For example instructions may be provided for: receiving a register access request from a host device directed to a memory register address within a host register memory space of the data storage controller. Instructions may be provided for determining whether or not the register access request is executable using hardware memory registers of the data storage controller. Instructions may be provided for, in response to a determination that the register access request is executable using the hardware memory registers of the data storage controller, executing the register access request using a corresponding memory register of the data storage controller. Instructions may be provided for, in response to a determination that the register access request is not executable using the hardware memory registers of the data storage controller, executing the register access request using a processor of the data storage controller.

Figure 13:
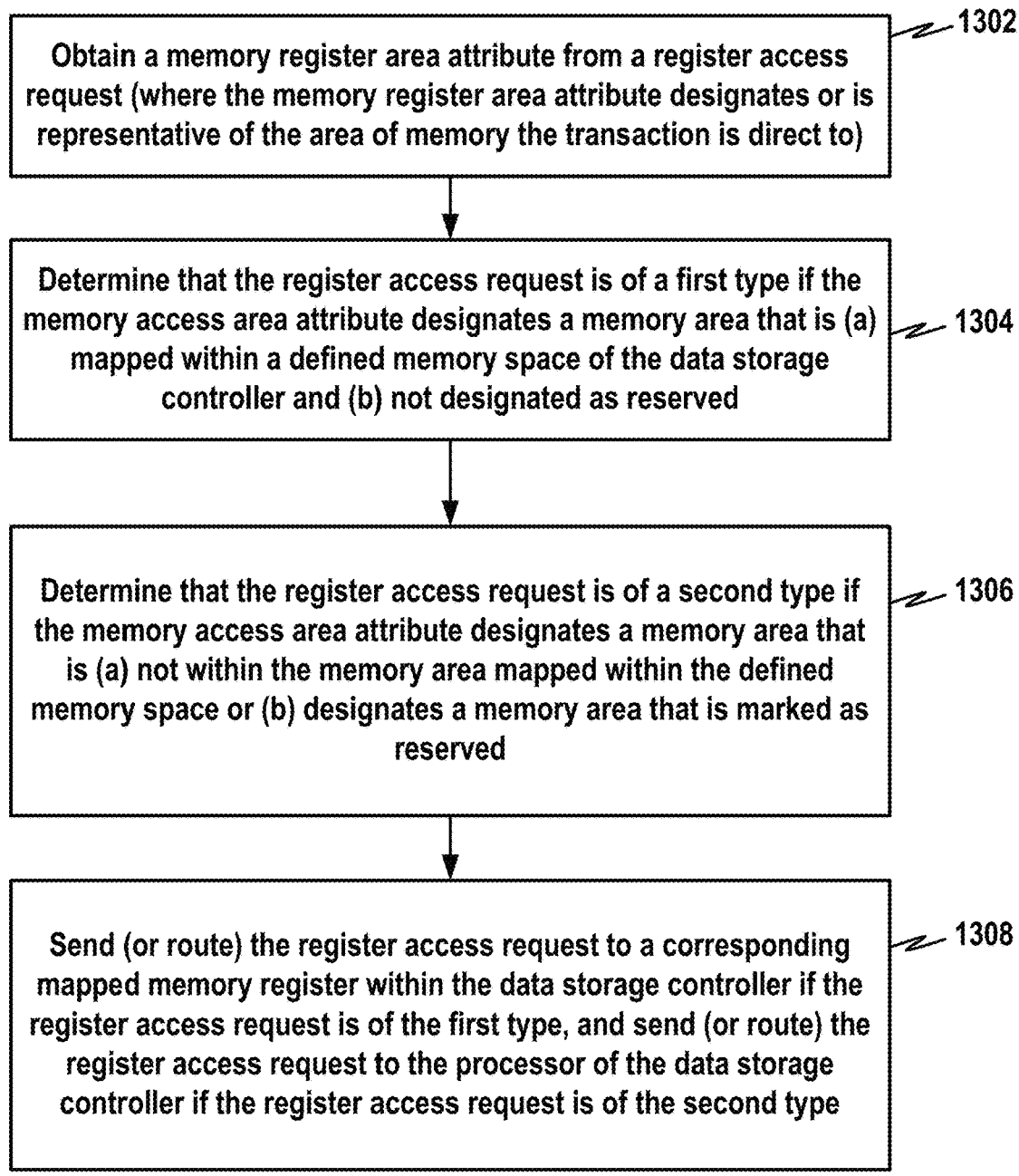
FIG. 13 is a flow chart summarizing still yet other selected operations of a data storage controller or other suitable device, which distinguish between different types of register access requests based, at least in part, on a memory register area attribute or parameter.

FIG. 13 summarizes exemplary operations 1300 for use by or with a data storage controller or other suitable device, which operate to exploit a memory register area attribute to distinguish between different types of register access requests. Briefly, at block 1302, the data storage controller obtains a memory register area attribute from a register access request (where, as discussed above, the memory register area attribute includes parameters or other information that designates or is representative of the area of memory a transaction is direct to). At block 1304, the data storage controller determines that the register access request is of a first type if the memory access area attribute designates a memory area that is (a) mapped within a defined memory space of the data storage controller and (b) not designated as reserved. At block 1306, the data storage controller determines that the register access request is of a second type if the memory access area attribute designates a memory area that is (a) not within the memory area mapped within the defined memory space or (b) designates a memory area that is marked as reserved. At block 1308, the data storage controller sends (or routes) the register access request to a corresponding mapped memory register within the data storage controller if the register access request is of the first type, and sends (or routes) the register access request to the processor of the data storage controller if the register access request is of the second type. These features were discussed above.

Figure 14:
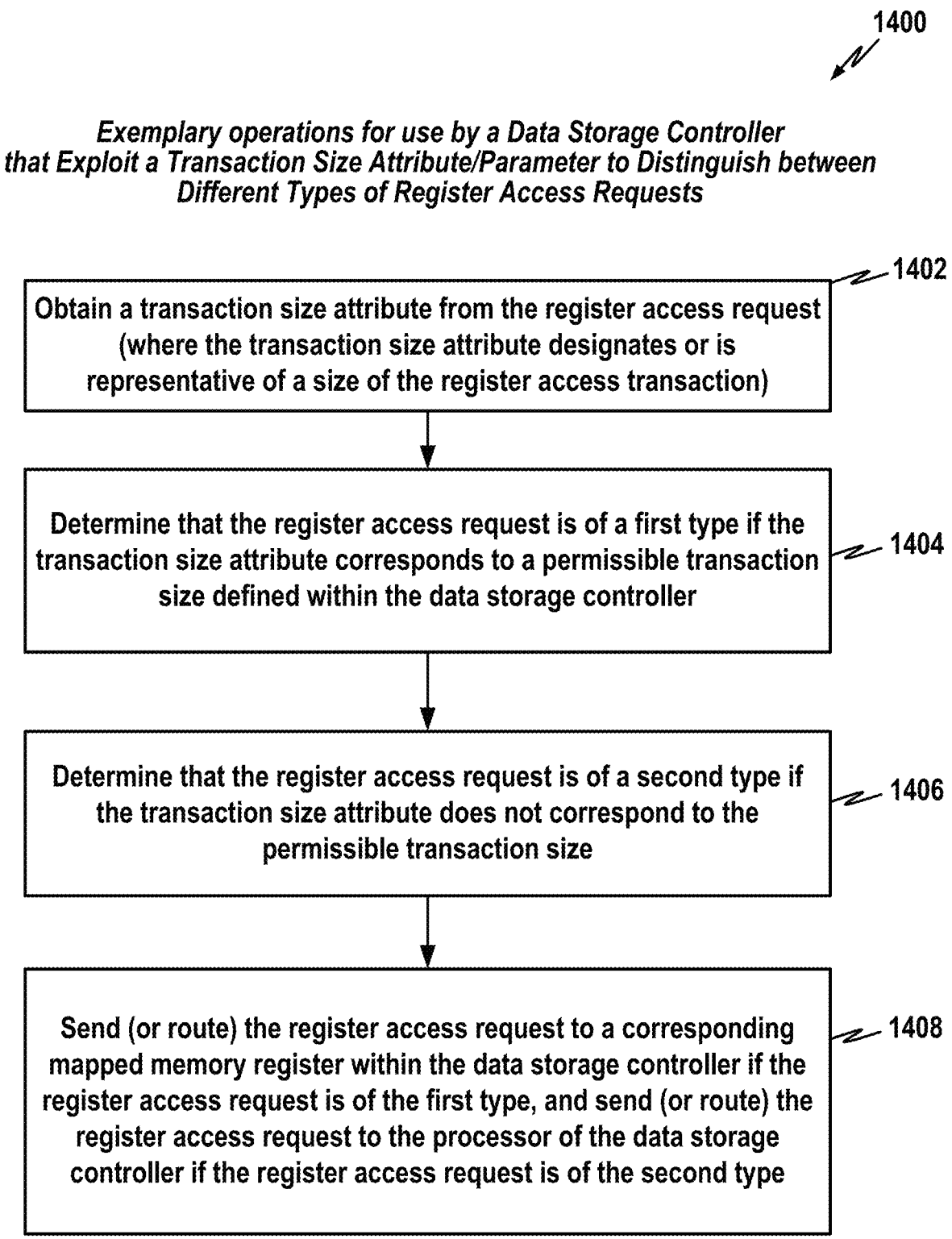
FIG. 14 is a flow chart summarizing still other selected operations of a data storage controller or other suitable device, which distinguish between different types of register access requests based, at least in part, on a transaction size attribute or parameter.

FIG. 14 summarizes exemplary operations 1400 for use by or with a data storage controller or other suitable device, which operate to exploit a transaction size attribute to distinguish between different types of register access requests. Briefly, at block 1402, the data storage controller obtains a transaction size attribute from the register access request (where, as discussed above, the transaction size attribute includes parameters or other information that designates or is representative of a size of the register access transaction). At block 1404, the data storage controller determines that the register access request is of a first type if the transaction size attribute corresponds to a permissible transaction size defined within the data storage controller. At block 1406, the data storage controller determines that the register access request is of a second type if the transaction size attribute does not correspond to the permissible transaction size. At block 1408, the data storage controller sends (or routes) the register access request to a corresponding mapped memory register within the data storage controller if the register access request is of the first type, and sends (or routes) the register access request to the processor of the data storage controller if the register access request is of the second type. These features were discussed above.

Figure 15:
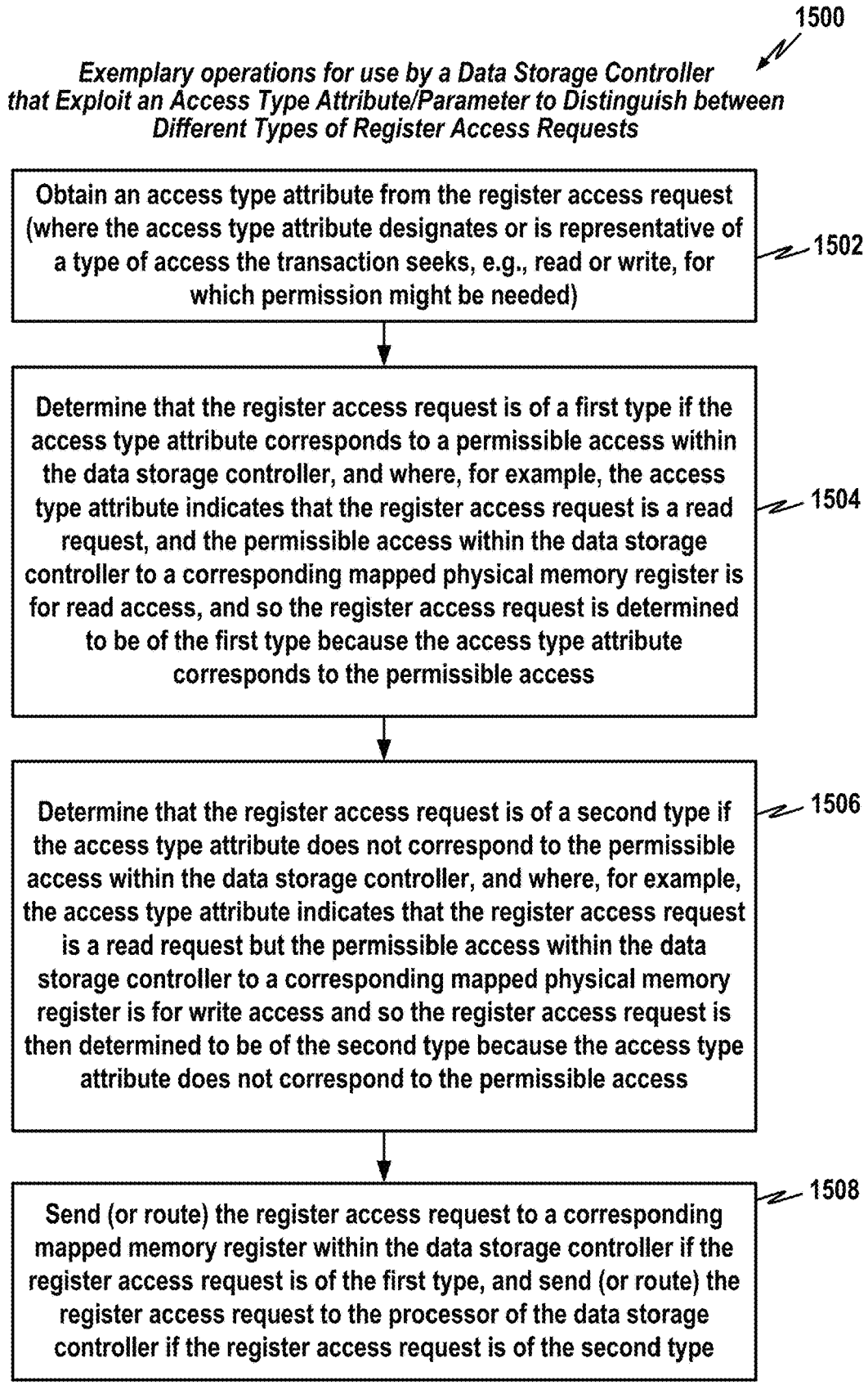
FIG. 15 is a flow chart summarizing additional selected operations of a data storage controller or other suitable device, which distinguish between different types of register access requests based, at least in part, on access type attribute or parameter.

FIG. 15 summarizes exemplary operations 1500 for use by or with a data storage controller or other suitable device, which operate to exploit an access type attribute to distinguish between different types of register access requests. Briefly, at block 1502, the data storage controller obtains an access type attribute from the register access request (where the access type attribute designates or is representative of a type of access that the transaction seeks, e.g. read or write, for with permission might be needed). At block 1504, the data storage controller determines that the register access request is of a first type if the access type attribute corresponds to a permissible access within the data storage controller, and where, for example, the access type attribute indicates that the register access request is a read request, and the permissible access within the data storage controller to a corresponding mapped physical memory register is for read access, and so (in this example) the register access request is determined to be of the first type because the access type attribute corresponds to the permissible access. At block 1506, the data storage controller determines that the register access request is of a second type if the access type attribute does not correspond to the permissible access within the data storage controller, and where, for example, the access type attribute indicates that the register access request is a read request but the permissible access within the data storage controller to a corresponding mapped physical memory register is for write access and so (in this example) the register access request is then determined to be of the second type because the access type attribute does not correspond to the permissible access. At block 1508, the data storage controller sends (or routes) the register access request to a corresponding mapped memory register within the data storage controller if the register access request is of the first type, and sends (or routes) the register access request to the processor of the data storage controller if the register access request is of the second type. These features were discussed above.

Figure 16:
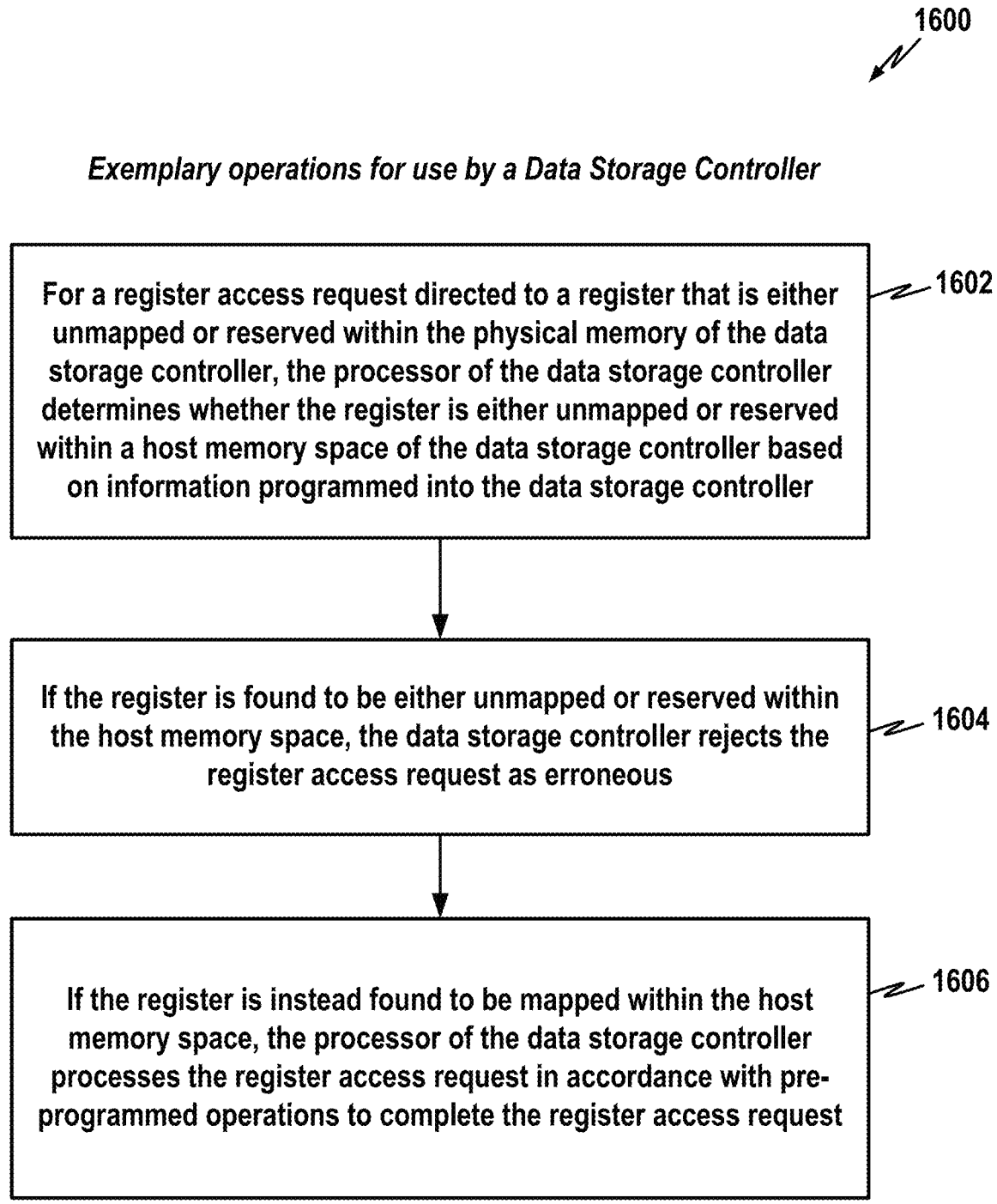
FIG. 16 is a flow chart summarizing additional selected operations of a data storage controller or other suitable device, which processes register access requests based on whether the requests are unmapped or reserved within a host register memory space.

FIG. 16 summarizes still other exemplary operations 1600 for use by or with a data storage controller or other suitable device. Briefly, at block 1602, for a register access request directed to a register that is either unmapped or reserved within the physical memory of the data storage controller, the processor of the data storage controller determines whether the register is either unmapped or reserved within a host memory space of the data storage controller based on information programmed into the data storage controller. At block 1604, if the register is found to be either unmapped or reserved within the host memory space, the data storage controller rejects the register access request as erroneous. At block 1606, if the register is instead found to be mapped within the host memory space, the processor of the data storage controller processes the register access request in accordance with pre-programmed operations to complete the register access request. These features were discussed above.

The subject matter described herein can be implemented in any suitable NAND flash memory, including 2D or 3D NAND flash memory. Semiconductor memory devices include volatile memory devices, such as DRAM) or static random access memory (SRAM) devices, non-volatile memory devices, such as resistive random access memory (ReRAM), electrically erasable programmable read only memory (EEPROM), flash memory (which can also be considered a subset of EEPROM), ferroelectric random access memory (FRAM), and magnetoresistive random access memory (MRAM), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Furthermore, as used herein, a phrase referring to "at least one of" a list of items refers to any combination of those items, including single members. By way of example, "at least one of: A, B, or C" is intended to cover A, B, C, A-B, A-C, B-C, and A-B-C, as well as multiples of the same members (e.g., any lists that include AA, BB, or CC). Likewise, "at least one of: A, B, and C" is intended to cover A, B, C, A-B, A-C, B-C, and A-B-C, as well as multiples of the same members. Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Various details of the presently disclosed subject matter may be changed without departing from the scope of the presently disclosed subject matter. Furthermore, the foregoing description is for the purpose of illustration only, and not for the purpose of limitation.

What is claimed is:

1. A method for use by a data storage controller, comprising:
   receiving a register access request from a host device directed to a memory register address within a host register memory space of the data storage controller;
   determining whether or not the register access request is executable using hardware memory registers of the data storage controller based on whether the memory register address is mapped or unmapped and whether the memory register address is reserved or not reserved within a physical memory of the data storage controller;
   in response to a determination that the register access request is executable using the hardware memory registers of the data storage controller, executing the register access request using a corresponding memory register of the data storage controller; and
   in response to a determination that the register access request is not executable using the hardware memory registers of the data storage controller, executing the register access request using a processor of the data storage controller.

2. The method of claim 1, wherein determining whether the register access request is executable using the hardware memory registers of the data storage controller based on whether the memory register address is mapped or unmapped and whether the memory register address is reserved or not reserved within a physical memory of the data storage controller, comprises:

determining whether the register access request is of a first type or of a second type;
wherein a register access request of the first type is directed to a memory register address that is both mapped and not reserved within the physical memory of the data storage controller; and
wherein a register access request of the second type is directed to a memory register address that is either unmapped or reserved within the physical memory of the data storage controller.

3. The method of claim 2, further comprising:
sending the register access request to a corresponding mapped memory register within the data storage controller if the register access request is of the first type; and
sending the register access request to the processor of the data storage controller if the register access request is of the second type.

4. The method of claim 3,
wherein sending the register access request to the processor includes sending register access request attributes along with the register access request to the processor, and
wherein the processor processes the register access request using software and/or firmware based, at least in part, on the register access request attributes.

5. The method of claim 4,
wherein, for a register access request directed to a register that is either unmapped or reserved within the physical memory of the data storage controller, the processor determines whether the register is either unmapped or reserved within the host memory space based on information programmed into the data storage controller; and
wherein, if the register is determined to be either unmapped or reserved within the within the host memory space, the data storage controller rejects the register access request.

6. The method of claim 5,
wherein, if the register is determined to be mapped within the host memory space, the processor processes the register access request in accordance with pre-programmed operations to complete the register access request.

7. The method of claim 2, wherein determining whether the register access request is of the first type or of the second type, comprises:
obtaining a memory register area attribute from the register access request;
determining that the register access request is of the first type if the memory access area attribute designates a memory area that is (a) mapped within a defined memory space of the data storage controller and (b) not designated as reserved; and
determining that the register access request is of the second type if the memory access area attribute designates a memory area that is (a) not within the memory area mapped within the defined memory space or (b) designates a memory area that is marked as reserved.

8. The method of claim 2, wherein determining whether the register access request is of the first type or of the second type, comprises:
obtaining a transaction size attribute from the register access request;
determining that the register access request is of the first type if the transaction size attribute corresponds to a permissible transaction size defined within the data storage controller; and
determining that the register access request is of the second type if the transaction size attribute does not correspond to the permissible transaction size.

9. The method of claim 2, wherein determining whether the register access request is of the first type or of the second type, comprises:
obtaining an access type attribute from the register access request;
determining that the register access request is of the first type if the access type attribute corresponds to a permissible access within the data storage controller; and
determining that the register access request is of the second type if the access type attribute does not correspond to the permissible access within the data storage controller.

10. The method of claim 9,
wherein the access type attribute indicates that the register access request is a read request and the permissible access within the data storage controller to a corresponding mapped physical memory register is for read access; and
wherein the register access request is then determined to be of the first type because the access type attribute corresponds to the permissible access.

11. The method of claim 9,
wherein the access type attribute indicates that the register access request is a read request but the permissible access within the data storage controller to a corresponding mapped physical memory register is for write access; and
wherein the register access request is then determined to be of the second type because the access type attribute does not correspond to the permissible access.

12. The method of claim 1,
wherein executing the register access request using the corresponding memory register of the data storage controller includes processing the register access request using hardware of the data storage controller; and
wherein executing the register access request using the processor of the data storage controller includes processing the register access request using software running on the processor and/or firmware associated with the processor.

13. The method of claim 1, wherein the data storage controller is coupled to a non-volatile memory (NVM) device, and wherein the data storage controller accesses the NVM device based on memory access commands issued by the host device.

14. A data storage controller, comprising:
a processor;
one or more hardware memory registers; and
a processing component configured to
receive a register access request from a host device directed to a memory register address within a host register memory space of the data storage controller, and
determine whether the register access request is executable using the one or more hardware memory registers based on whether the memory register address is mapped or unmapped and whether the memory register address is reserved or not reserved within a physical memory of the data storage controller, and if the register access request is executable using the one or more hardware memory registers, execute the register access request using a corresponding hardware memory register of the data storage controller, and, if the register access request is not executable using the one or more hardware memory registers, execute the register access request using the processor of the data storage controller.

15. The data storage controller of claim 14, wherein the processing component includes an input component configured to input the register access request.

16. The data storage controller of claim 14, wherein the processing component includes an arbiter configured to determine whether the register access request is executable using the one or more hardware memory registers.

17. The data storage controller of claim 14,
wherein the processing component includes routing circuitry to route the register access request to a hardware memory register, if the register access request is executable using at least one of the hardware memory registers, and to route the register access request to the processor, if the register access request is executable using at least one of the hardware memory registers.

18. The data storage controller of claim 14, wherein the data storage controller is coupled to a non-volatile memory (NVM) device.

19. A data storage controller, comprising:
a processor;
one or more hardware memory registers;
a register access request input controller configured to receive a register access request from a host device directed to a memory register address within a host register memory space of the data storage controller;
a determination controller configured to determine whether or not the register access request is executable using the one or more hardware memory registers based on whether the memory register address is mapped or unmapped and whether the memory register address is reserved or not reserved within a physical memory of the data storage controller;
a hardware execution routing circuit configured to route the register access request to the hardware memory registers for execution using a corresponding memory register in response to a determination that the register access request is executable using the one or more hardware memory registers; and
a processor execution routing circuit configured to route the register access request to the processor for execution using the processor in response to a determination that the register access request is not executable using the one or more hardware memory registers.

20. The data storage controller of claim 19, wherein the determination controller comprises one or more of an arbiter or a multiplexer.

21. The data storage controller of claim 19, wherein the data storage controller is coupled to a non-volatile memory (NVM) device.

22. The data storage controller of claim 21, wherein the data storage controller is configured to process commands requests from the host device in accordance with non-volatile memory express (NVMe) protocols.

23. An apparatus for use with a data storage controller, comprising:
means for receiving a register access request from a host device directed to a memory register address within a host register memory space of the data storage controller;
means for determining whether the register access request is executable using hardware memory registers of the data storage controller based on whether the memory register address is mapped or unmapped and whether the memory register address is reserved or not reserved within a physical memory of the data storage controller; and
means, responsive to a determination that the register access request is executable using hardware memory registers of the data storage controller, for executing the register access request using a corresponding memory register of the data storage controller, and for executing the register access request using a processor of the data storage controller otherwise.

24. The apparatus of claim 23, wherein the means for determining whether the register access request is executable using the hardware memory registers, comprises:
means for determining whether the register access request is directed to a memory register address that is both mapped and not reserved within the physical memory of the data storage controller; and
means for determining whether the register access request is directed to a memory register address that is either unmapped or reserved within the physical memory of the data storage controller.

25. The apparatus of claim 24, further comprising:
means for sending the register access request to a corresponding mapped memory register within the data storage controller if the register access request is determined to be both mapped and not reserved within the physical memory of the data storage controller; and
means for sending the register access request to the processor of the data storage controller if the register access request is determined to be either unmapped or reserved within the physical memory of the data storage controller.

* * * * *